(12) United States Patent
Wangler et al.

(10) Patent No.: US 8,752,500 B2
(45) Date of Patent: Jun. 17, 2014

(54) NON-METALLIC DONELESS INDICATOR

(76) Inventors: Eric J. Wangler, Mendon, NY (US);
Thomas O. Pierce, Rochester, NY (US);
David P. Prior, Rochester, NY (US)

( * ) Notice: Subject to any disclaimer, the term of this patent is extended or adjusted under 35 U.S.C. 154(b) by 313 days.

(21) Appl. No.: 13/373,988

(22) Filed: Dec. 7, 2011

(65) Prior Publication Data
US 2012/0285365 A1 Nov. 15, 2012

Related U.S. Application Data

(60) Provisional application No. 61/518,619, filed on May 9, 2011.

(51) Int. Cl.
*G01K 11/06* (2006.01)
*G01K 13/10* (2006.01)

(52) U.S. Cl.
USPC .................... 116/218; 374/155; 374/E11.006

(58) Field of Classification Search
USPC .................. 116/216, 217, 218; 374/150, 160, 374/E11.006, E11.007; 99/342, 343, 344
See application file for complete search history.

(56) References Cited

U.S. PATENT DOCUMENTS

| 3,872,822 | A | * | 3/1975 | Ayres | 116/218 |
| 4,170,956 | A | * | 10/1979 | Wear | 116/218 |
| 4,235,427 | A | * | 11/1980 | Bialobrzeski | 267/153 |
| 4,748,931 | A | | 6/1988 | Volk | |
| 5,203,278 | A | | 4/1993 | Kinney | |
| 5,487,352 | A | | 1/1996 | Williams et al. | |
| 5,537,950 | A | * | 7/1996 | Ou-Yang | 116/218 |
| 5,549,370 | A | * | 8/1996 | Folsom | 267/149 |
| 5,988,102 | A | | 11/1999 | Volk et al. | |
| 6,848,390 | B2 | * | 2/2005 | Akers et al. | 116/216 |
| 2005/0211153 | A1 | * | 9/2005 | Ribi et al. | 116/218 |
| 2009/0092519 | A1 | * | 4/2009 | Stewart et al. | 422/82.12 |
| 2009/0243174 | A1 | * | 10/2009 | Spencer et al. | 267/169 |

FOREIGN PATENT DOCUMENTS

| CN | 102261964 A | * | 11/2011 | ............. G01K 11/06 |
| JP | 61055418 A | * | 3/1986 | ............... F16F 1/06 |
| WO | WO 9506862 A1 | * | 3/1995 | ............. G01K 11/06 |

* cited by examiner

*Primary Examiner* — R. A. Smith
(74) *Attorney, Agent, or Firm* — John C. McMahon

(57) ABSTRACT

A non-metallic pop-up "doneness" indicator to indicate that a food item has reached a desired temperature, including a housing, a stem, button indicator and an actuation subassembly. Methods of manufacture are included.

6 Claims, 7 Drawing Sheets

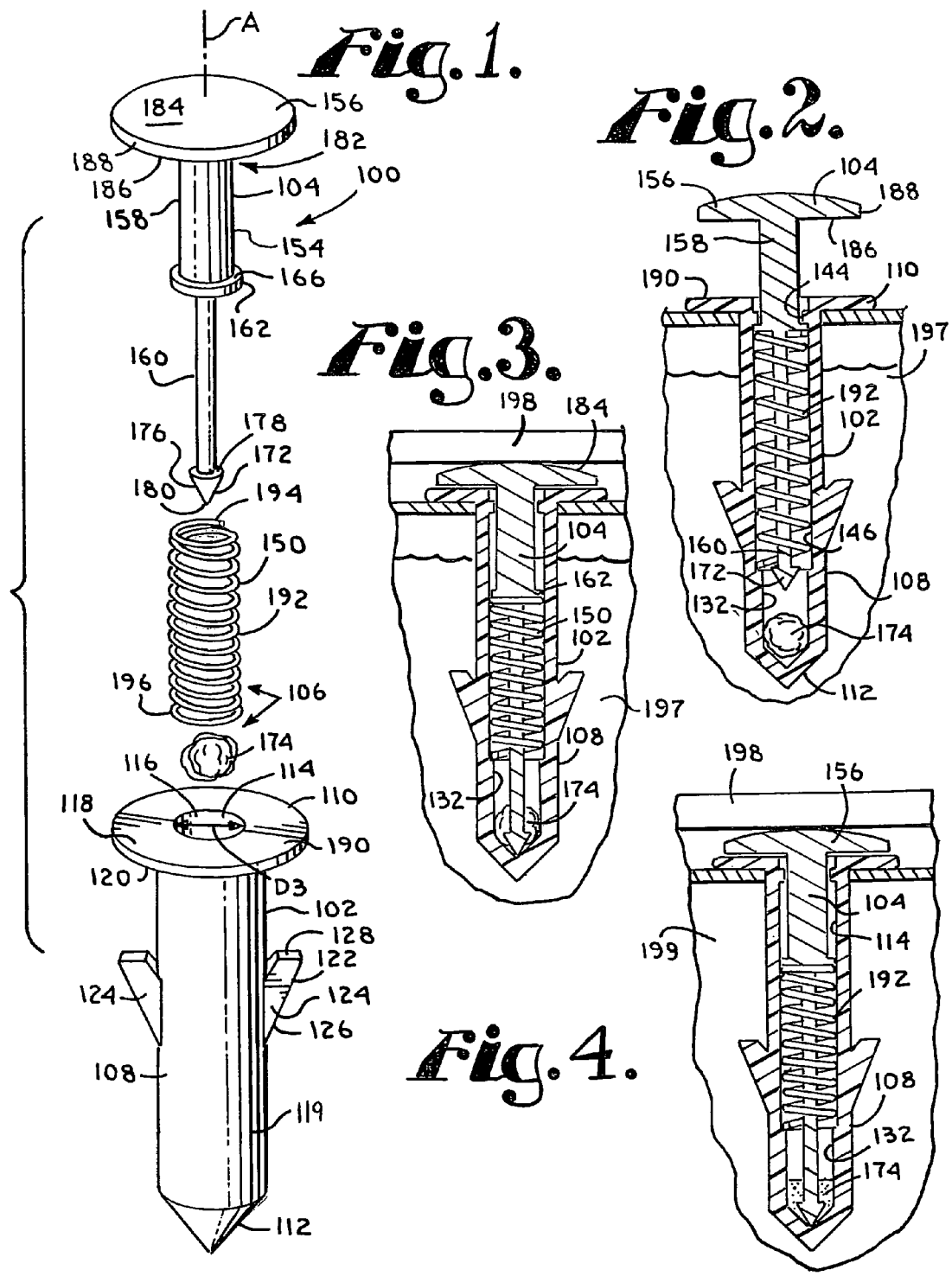

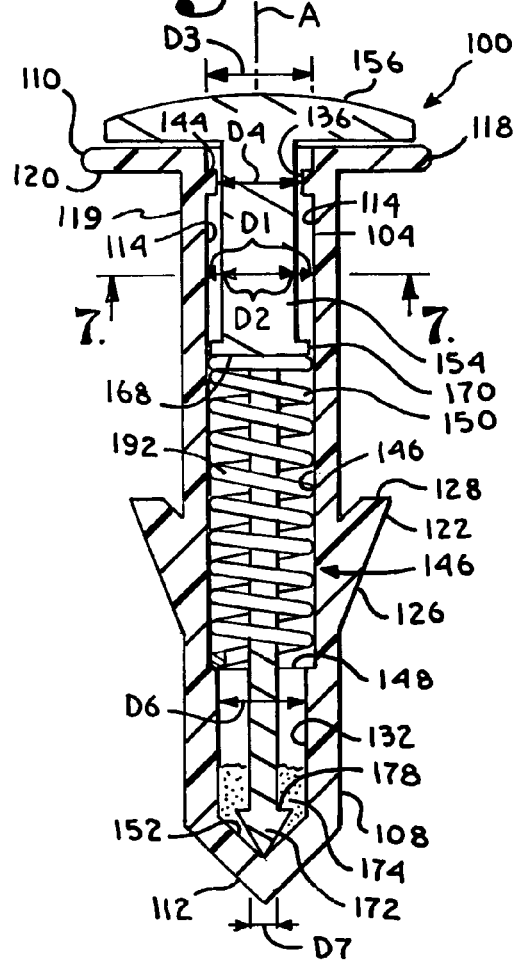
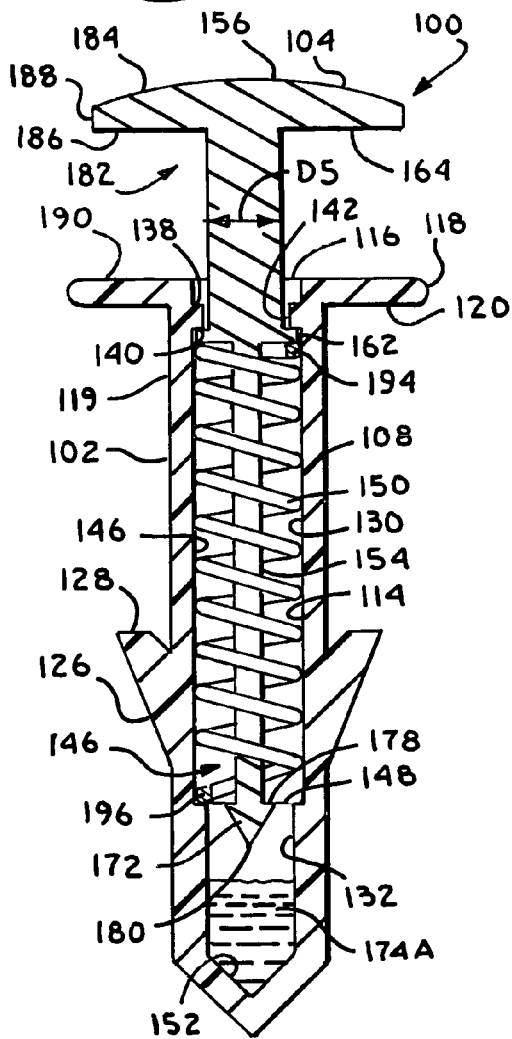
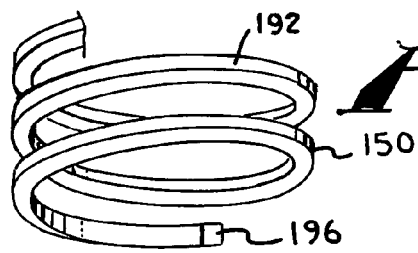

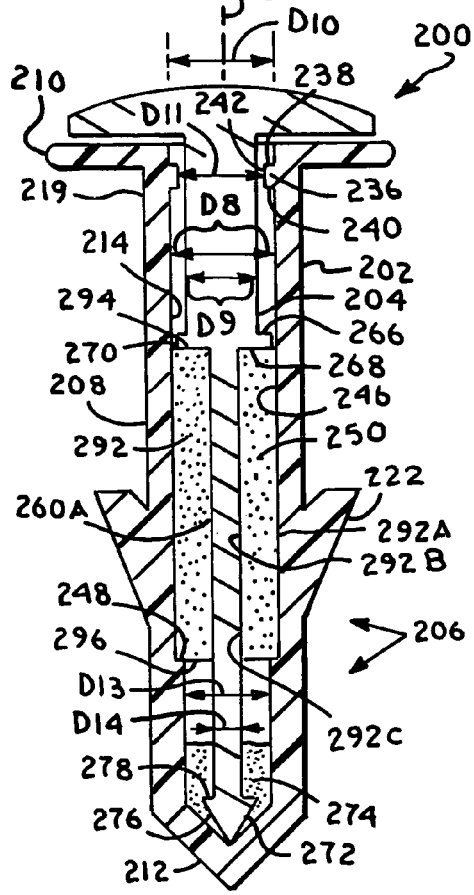
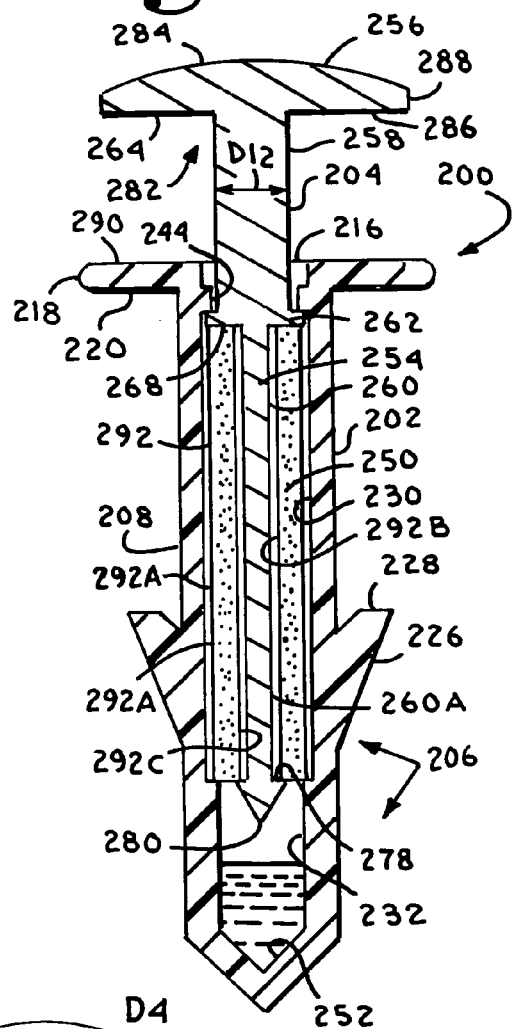
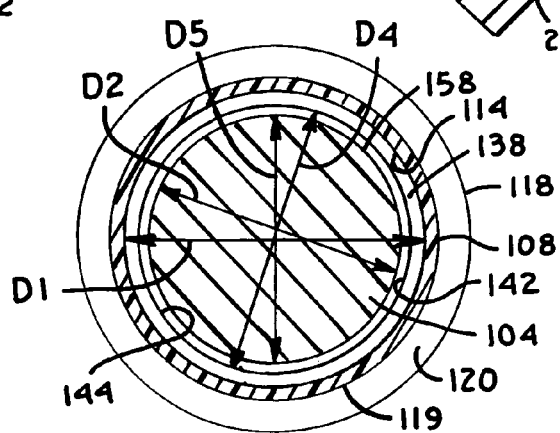

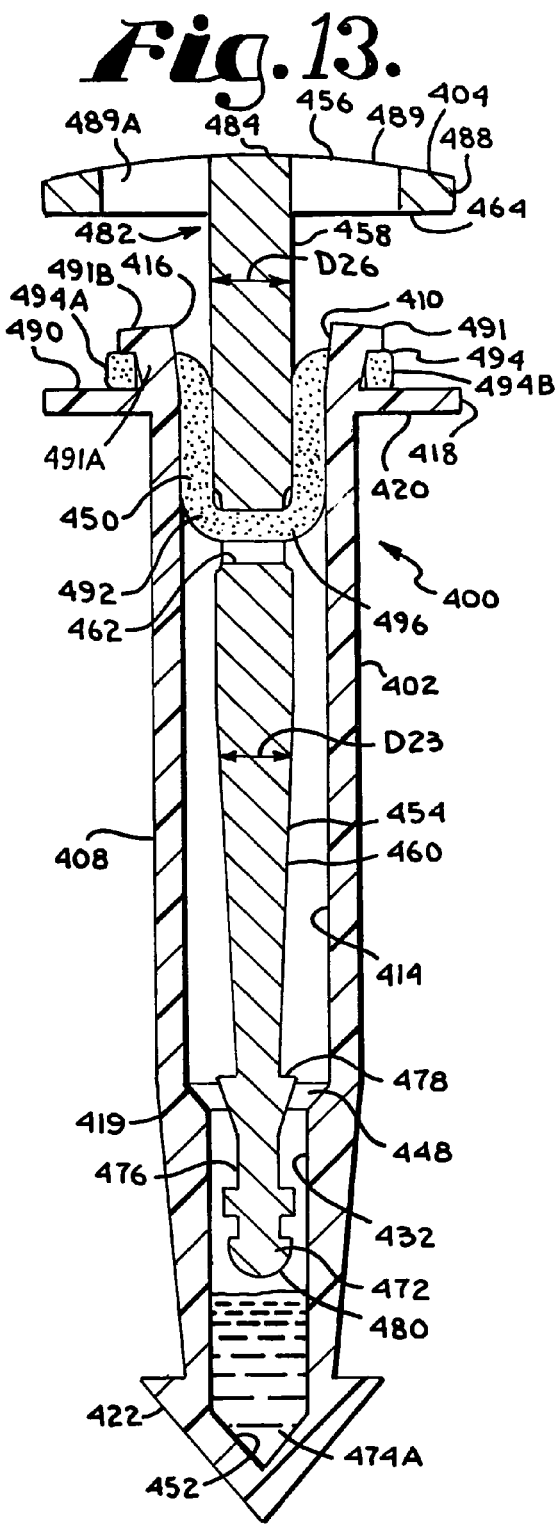

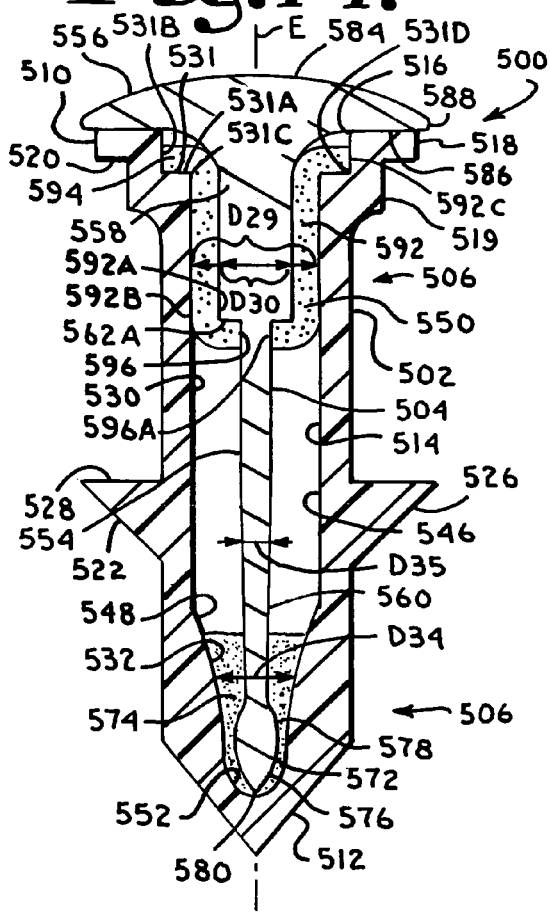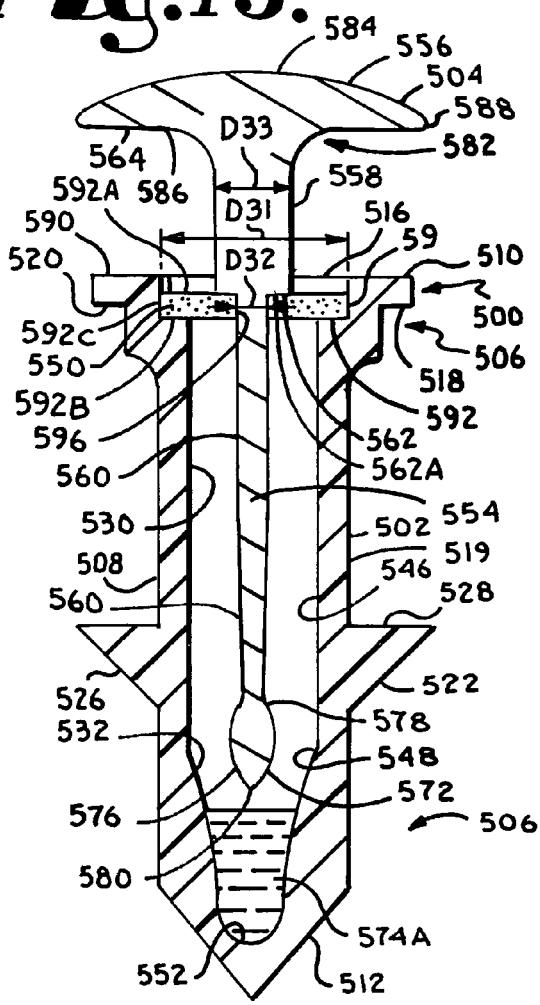

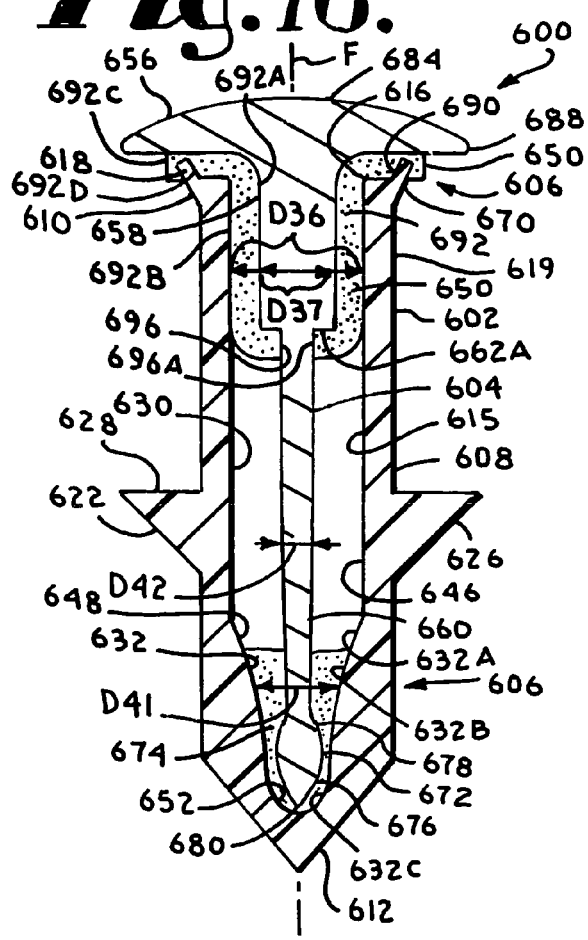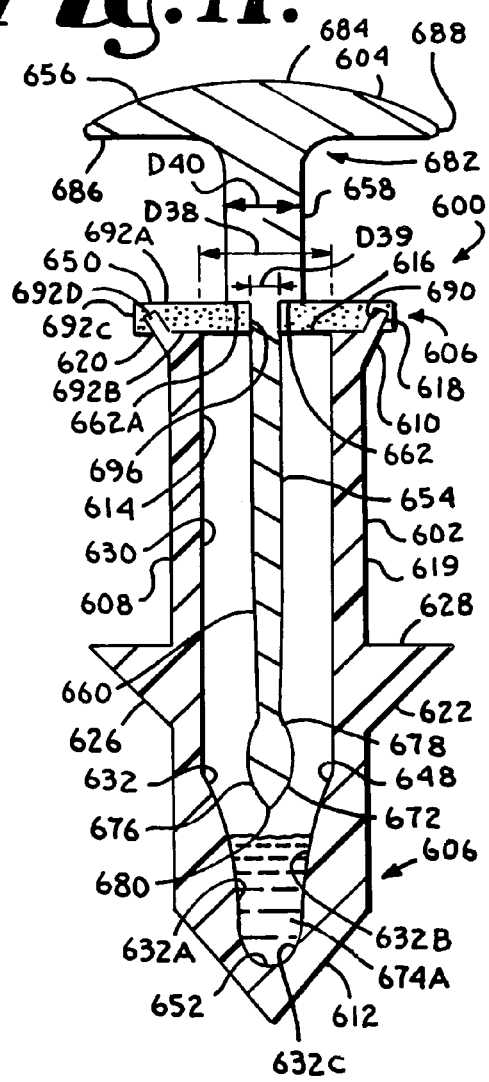

NON-METALLIC DONELESS INDICATOR

CROSS-REFERENCE TO RELATED APPLICATIONS

This application claims the benefit of U.S. Provisional Patent Application Ser. No. 61/518,619 filed May 9, 2011 that is incorporated by reference herein.

BACKGROUND OF THE INVENTION

An apparatus for indicating that a food has reached a desired temperature and is "done" cooking.

Some people, including pregnant women and their unborn babies and newborns, young children, older adults, people with weakened immune systems, and individuals with certain chronic illnesses, may be at high risk for developing foodborne illness. The most commonly recognized foodborne infections are those caused by the bacteria *Campylobacter*, *Salmonella*, and *E. coli* O157:H7, and by a group of viruses called calicivirus, also known as the Norwalk and Norwalk-like viruses. The U.S. Department of Agriculture recommends using a food thermometer when cooking meat, poultry, and even egg dishes in order to prevent the spread of foodborne illness due to the presence of harmful bacteria in the food.

Temperature indicators for cooked foods, especially meats, are well known in the art. Typically, such temperature indicators include an outer housing and an internal, centrally located and movable stem. The stem is typically spring loaded and held in a withdrawn configuration or position by a solid, fusible material. Upon attainment of the desired temperature, the fusible material softens, allowing the force of the compressed spring to push the stem outward, thereby indicating that the desired temperature for the cooked food has been obtained.

SUMMARY OF THE INVENTION

An apparatus for indicating doneness or attainment of a particular temperature of a food object, in which the apparatus is inserted, is provided. The apparatus includes a longitudinally extending housing adapted for insertion into the food object in which attainment of a particular temperature is to be indicated. The housing includes an open first end, a closed second end sized and shaped for insertion into the food object, and a longitudinally extending central bore with an orifice and a lower chamber. The orifice joins the central bore with an exterior of the housing first end. The chamber is associated with the housing second end. A movable indicator structure cooperates with the housing to indicate attainment of the particular temperature associated with the doneness of the food item, and includes an elongate stem and a button indicator. The stem extends longitudinally within the central bore and has upper and lower portions. The button indicator is joined with the stem at an upper end thereof. The apparatus includes an actuation subassembly adapted for biasing the indicator structure from a closed configuration to an open configuration when the particular temperature is attained. The actuation subassembly includes a food-safe non-metallic biasing member, for biasing the stem away from the lower chamber, and a food-safe non-metallic high-melt plug adapted to soften when the particular temperature is attained. The high-melt plug is located in the lower chamber and releasably engages a lower end of the stem when the indicator structure is in the closed configuration.

In a further embodiment, the biasing member biases the stem lower end away from the lower chamber.

In a further embodiment, the plug is not substantially softened when the particular temperature has not been attained.

In a further embodiment, the plug is at least one of a wax and a polymer.

In a further embodiment, the plug softens at a temperature of at least about 140° F. (60.0° C.), 145° F. (62.8° C.), 150° F. (65.6° C.), 155° F. (68.3° C.), 160° F. (71.1° C.), 165° F. (73.9° C.), 170° F. (76.7° C.), 175° F. (79.4° C.), 180° F. (82.2° C.), 185° F. (85.0° C.), 190° F. (87.8° C.) or higher.

In a further embodiment, the closed configuration is associated with non-attainment of the particular temperature.

In a further embodiment, the open configuration is associated with attainment of the particular temperature.

In a further embodiment, the biasing member concentrically surrounds the stem lower portion and is movable within central bore; and the biasing member engages an inner shoulder of the bore and a stop portion of the stem, for biasing the stem stop portion away from the bore lower inner shoulder.

In a further embodiment, the biasing member is selected from the group consisting of a coil, a cylindrical tube and a corrugated tube.

In a further embodiment, the biasing member includes at least one of a flexible polymer and an elastic polymer.

In a further embodiment, when the indicator structure is in the closed configuration, the biasing member is compressed and the button indicator is adjacent to the housing first end; and when the indicator structure is in the open configuration, the biasing member is not substantially compressed and the button indicator is spaced from the housing first end.

In a further embodiment, the housing first end includes a pair of opposed upwardly extending fingers; the stem includes a perpendicular through-bore spaced below the button indicator; and the biasing member includes an extensible elastic band extending through the through-bore and engaging each of the fingers.

In a further embodiment, when the indicator structure is in the closed configuration, the elastic band is stretched and the button indicator is adjacent to the housing first end; and when the indicator structure is in the open configuration, the elastic band is not substantially stretched and the button indicator is spaced from the housing first end.

In a further embodiment, the bore orifice includes a radially extending ledge portion; the non-metallic biasing member includes an elastic diaphragm with n inner surface engaging the ledge portion; an outer surface opposed to the inner surface; and a central perforation joining the inner and outer surfaces and having a first diameter, the first diameter being less than a diameter of the stem upper portion and greater than a diameter of the stem lower portion; and wherein the stem lower portion extends through the diaphragm perforation; and a stem central shoulder portion engages the diaphragm outer surface.

In a further embodiment, when the indicator structure is in the closed configuration, the diaphragm is stretched into the bore and the button indicator is adjacent to the housing first end; and when the indicator structure is in the open configuration, the diaphragm is not substantially stretched and the button indicator is spaced from the housing first end.

In a further embodiment, the diaphragm includes an outer diameter that is greater than an outer diameter of the housing first end; and an attachment portion adapted for frictional engagement with the housing first end.

In a further embodiment, the elastic diaphragm is substantially circular in a plane perpendicular to a longitudinal axis of the housing.

The drawings constitute a part of this specification and include exemplary embodiments of the present invention and illustrate various objects and features thereof.

BRIEF DESCRIPTION OF THE DRAWINGS

FIG. 1 is an exploded view of a non-metallic doneness indicating apparatus 100, in a first embodiment.

FIG. 2 is a reduced cross-sectional side view of the non-metallic doneness indicating apparatus 100 of FIG. 1, illustrating a first step in assembly.

FIG. 3 is a reduced cross-sectional side view of the non-metallic doneness indicating apparatus 100 of FIG. 1, illustrating a second step in assembly.

FIG. 4 is a reduced cross-sectional side view of the non-metallic doneness indicating apparatus 100 of FIG. 1, illustrating a third step in assembly.

FIG. 5 is an enlarged cross-sectional side view of the non-metallic doneness indicating apparatus 100 of FIG. 1, in a closed configuration.

FIG. 6 is a cross-sectional side view of the non-metallic doneness indicating apparatus 100 of FIG. 5 in an open configuration.

FIG. 6b is a partial side elevational view of a biasing member for use in the indicating apparatus.

FIG. 7 is an enlarged cross-sectional bottom view of the apparatus 100 of FIG. 5, wherein the cross-section has been taken along the line 7-7 of FIG. 5.

FIG. 8 is a cross-sectional side view of a non-metallic doneness indicating apparatus 200 in a closed configuration, in a second embodiment.

FIG. 9 is a cross-sectional side view of the non-metallic doneness indicating apparatus 200 of FIG. 9 in an open configuration.

FIG. 10 is a cross-sectional side view of a non-metallic doneness indicating apparatus 300 in a closed configuration, in a third embodiment.

FIG. 11 is a cross-sectional side view of the non-metallic doneness indicating apparatus 300 of FIG. 10 in an open configuration.

FIG. 12 is a cross-sectional side view of a non-metallic doneness indicating apparatus 400 in a closed configuration, in a fourth embodiment.

FIG. 13 is a cross-sectional side view of the non-metallic doneness indicating apparatus 400 of FIG. 12 in an open configuration.

FIG. 14 is a cross-sectional side view of a non-metallic doneness indicating apparatus 500 in a closed configuration, in a fifth embodiment.

FIG. 15 is a cross-sectional side view of the non-metallic doneness indicating apparatus 500 of FIG. 14 in an open configuration.

FIG. 16 is a cross-sectional side view of a non-metallic doneness indicating apparatus 600 in a closed configuration, in a sixth embodiment.

FIG. 17 is a cross-sectional side view of the non-metallic doneness indicating apparatus 600 of FIG. 16 in an open configuration.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIGS. 1 and 5-7, the apparatus of the instant invention, generally 100, is a non-metallic, food-safe, "pop-up" temperature indicator apparatus or device adapted to indicate when a food object, or item, has reached a specific temperature, and therefore is considered to be "done." The terms "done" and "doneness" as used herein are broad terms, and are to be given their ordinary and customary meaning to a person of ordinary skill in the art (and are not to be limited to a special or customized meaning), and refer without limitation to attainment of a specific temperature by a food object, portion or item, such as by the food object being cooked for a period of time. FIG. 1 is an exploded view of the non-metallic doneness indicator apparatus 100 in one embodiment. FIG. 5 shows the apparatus 100 in a closed configuration or position, which is associated with the food not being done. FIG. 6 shows the apparatus 100 in an open configuration or position, which is associated with the food being done.

The non-metallic doneness indicator apparatus 100, or device, is adapted for insertion into the food, such as a piece of meat (e.g., a roast or turkey carcass), a casserole, a desert, and the like. The apparatus 100 is adapted to withstand freezing, thawing, refrigeration and cooking without significant, or substantially without, physical breaking or malfunctioning. The apparatus 100 is removable from the food, such as prior to serving the food.

The apparatus 100 includes a longitudinal axis A, a longitudinally extending housing 102, a movable indicator structure 104, and an actuation subassembly, generally 106, that causes the indicator structure 104 to pop up when the food is done. When the food item has reached a specific internal temperature associated with doneness, the indicator structure 104 cooperates with the housing 102 so as to pop up and thereby provide a visually detectable indicator of food doneness. For example, depending upon the type of food, the temperature of the food, such as but not limited to the internal temperature, is at least about 140° F. (60.0° C.), 145° F. (62.8° C.), 150° F. (65.6° C.), 155° F. (68.3° C.), 160° F. (71.1° C.), 165° F. (73.9° C.), 170° F. (76.7° C.), 175° F. (79.4° C.), 180° F. (82.2° C.), 185° F. (85.0° C.), 190° F. (87.8° C.) or higher when the food is done.

It is noted that certain foods, such as but not limited to meats, have recommended internal cooking temperatures that are associated with blocking, neutralizing and/or killing a foodborne bacterial or viral pathogen, and at which the food may be considered to be done. For example, the USDA recommends that steaks, roasts and fish be cooked to an internal temperature of at least 145° F. (62.8° C.) to prevent foodborne illnesses. For pork, ground beef and egg dishes, the USDA recommends an internal temperature of at least 160° F. (71.1° C.). And, the USDA recommends that poultry be cooked to an internal temperature of at least 165° F. (73.9° C.). Generally, the internal temperature of a food item cannot be easily and/or accurately determined without the aid of a thermometer or other temperature indicating device, such as but not limited to the apparatus 100 of the instant invention.

The apparatus housing 102 includes a barrel-like body 108 that extends along the longitudinal axis A from an open first end 110 to a closed second end 112. The body 108 includes a centrally located longitudinal bore 114 that is coaxial with the longitudinal axis A. The first end 110 includes an orifice 116 and a radially extending flange portion 118. The orifice 116 joins the bore 114 with the exterior portion 119 of the body 108.

When in use, the substantially cylindrical body 108 is inserted into the food item until a lower surface 120 of the flange 118 contacts the surface of the food. The flange 118 provides an enlarged structure that substantially prevents the entire device 100 from being completely inserted or embedded into the food. The closed second end 112 is sized and shaped for piercing the food object. In the illustrated embodiment, the second end 112 is conical and pointed. However, it is foreseen that the second end 112 may be blunt, flat or semi-spherical, or may have numerous other shapes.

The body exterior portion 119 includes one or more outwardly extending fins 122, pins or barbs. The fins 122 are adapted for embedding themselves in the food item, after the apparatus 100 has been inserted into the food item, so as to prevent or resist removal of the apparatus 100 from the food object. In the illustrated embodiment, the fins 122 are spaced from both the housing first and second ends 110 and 112. However, it is foreseen that the fins 122 may be located relatively closer to either of the first and second ends 110 and 112. In some embodiments, the fins 122 are located so close to the second end 112 that the second end 112 includes the fins 122, which facilitates piercing of the food item by the second end 112. In some embodiments, the fins 122 are located so close to the first end 110 that the first end 110 includes the fins 122. In still other embodiments, the apparatus 100 lacks fins entirely.

In the illustrated embodiment of FIGS. 1 and 2, each of the fins 122 includes a pair of opposed faces 124 that are joined by a forward surface portion 126 and a rear surface portion 128. Each of the fins 122 includes a generally triangular cross-section, wherein the cross-section is taken parallel to the longitudinal axis A and evenly separates the faces 124, such as is shown in FIGS. 5 and 6. Thus, when viewed together, the fins 122 provide a downwardly facing arrowhead-like structure adapted to pierce the food item. In some embodiments, the faces 124 are spaced, planar and run parallel with one another and the longitudinal axis A, such that the fins 122 are substantially thin and flat, such as is shown in FIG. 1. In other embodiments, the rear surface portion 128 includes a width that is wider than a width of the forward surface portion 126, such that the fins 122 widen progressively from the forward surface portion 126 toward the rear surface portion 128, so as to form a wedge-shape that facilitates insertion of the apparatus 100 into the food item and substantially resists removal of the apparatus 100 from the food, such as during shipping from the manufacturer to the consumer or during cooking. It is foreseen that the faces 124 of the fins 122 may also be outwardly bowed. Numerous variations are foreseen.

The central bore 114 extends downwardly from the orifice 116 and longitudinally within the body 108 such that it is coaxial with the longitudinal axis A. The bore 114 includes a curvate inner surface 130 and a lower chamber 132. In the illustrated embodiment, the bore 114 includes a circular cross-section with a first diameter D1, wherein the cross-section is taken perpendicular to the longitudinal axis A. A plurality of bore cross-sections may be taken along the length of the bore 114, or along the longitudinal axis A, wherein each of the cross-sections includes a diameter D1, which, for example, may be denoted as $D1_1$, $D1_2$, $D1_3$, . . . , and $D1_n$, wherein n is an integer associated with one of the plurality of bore cross-sections taken. It is noted that the diameters $D1_n$ of the plurality of bore cross-sections may be equal, such as if the bore 114 is cylindrical along its entire length. Alternatively, the diameters $D1_n$ may vary in size continuously or intermittently along at least a portion of the length of the bore 114, such as if the bore 114 includes two cylindrical portions of different diameters $D1_n$, or such as if the bore 114 is at least partial conical or otherwise shaped. However, with the exception of certain portions of the apparatus 100 discussed below, each of the bore cross-section diameters D1, is substantially greater than a second diameter D2 of a perpendicular cross-section of the portion of the indicator structure 104 that must pass therethrough. In FIGS. 5 and 7, D1 is greater than D2.

The orifice 116 is located at the housing first end 110 and joins the central bore 114 with the housing exterior portion 119. The orifice 116 is sized and shaped to slidingly receive at least a portion of the indicator structure 104 therethrough. In the illustrated embodiment, the orifice is circular, with a diameter D3, wherein D3 is greater than D2. Accordingly, the indicator structure 104, which includes the diameter D2, can slidingly move through the orifice 116, or pop up, such as from the closed configuration of FIG. 5 to the open configuration of FIG. 6.

Near the orifice 116, the bore 114 includes a flange-like stop member 136 that cooperates with a portion of the indicator structure 104, described below, to prevent the indicator structure 104 from popping completely out of the bore 114, such as when the indicator structure pops up. In the illustrated embodiment, the stop member 136 is located within the bore 114 and spaced a small distance from the orifice 116. It is foreseen that the stop member 136 may be located at the orifice 116 or at the second end 112. In some embodiments, the orifice 116 includes the stop member 136. In other exemplary embodiments, the second end 112 includes the stop member 136. In still other embodiments, the apparatus 100 lacks a stop member 136.

In the illustrated embodiment, the stop member 136 is an inwardly extending ring, shelf, shoulder or flange that includes a pair of longitudinally spaced upper and lower annular surfaces 138 and 140 joined with a third surface 142 that forms an inner ring channel 144. The inner ring channel 144 includes a circular cross-section with a diameter D4, wherein the cross-section is taken perpendicular to the longitudinal axis A. As shown in FIG. 7, the diameter D4 of the inner ring channel 144 is smaller than the diameter D1 of the bore 114, yet the diameter D4 is at least slightly greater than a diameter D5 of the indicator structure 104 upper portion, which pops up through the inner ring channel 144 when doneness is achieved.

Referring now to FIGS. 5 and 6, the lower chamber 132 is located at the housing closed second end 112 and is substantially coaxial with the longitudinal axis A. In the illustrated embodiment, the chamber 132 is substantially cylindrical with a circular cross-section having a diameter D6, wherein the cross-section is taken perpendicular to the longitudinal axis A. In the illustrated embodiment, the chamber diameter D6 is reduced with respect to the diameter D1 of the portion of the bore 114 that extends upwardly from the chamber 132, said upwardly extending portion being denoted generally by the numeral 146. It is foreseen that the chamber diameter D6 may be equal to or greater than the diameter D1 of said upwardly extending portion 146 of the bore 114.

An inwardly extending shoulder portion 148 joins the bore upwardly extending portion 146 with the chamber 132. In the illustrated embodiment of FIGS. 5 and 6, the shoulder portion 148 is planar and runs substantially perpendicular to the longitudinal axis A, so as to form an inner annular ring or shelf with an inner diameter equal to the diameter D6 of the chamber and an outer diameter equal to about D1. It is foreseen that the shoulder portion 148 may also be conical or sloped, such as with a progressively reduced inner diameter when moving away from the first end 110 and towards the second end 112, so as to slope downwardly into the chamber 132. As is discussed below, the shoulder portion 148 frictionally engages a lower end of a biasing member 150, which is part of the actuation subassembly 106. At its lower end, the bottom surface 152 of the chamber 132 may be flat, concave, conical, a combination thereof, or otherwise contoured.

The indicator structure 104 cooperates with the housing 102 to indicate attainment of the particular temperature associated with the doneness of the food item. To do so, the indicator structure 104 moves from the closed configuration of FIG. 5 to the open configuration of FIG. 6. Referring to FIG. 1, the indicator structure 104 includes a longitudinally extending stem 154 and an indicator button 156. The stem 154 is slidingly received into the bore 114 through the orifice 116. When the apparatus 100 is in the closed configuration, such as is shown in FIG. 5, the indicator structure 104 extends from the orifice 116 to substantially near the chamber bottom surface 152, and may contact or touch the bottom surface 152, such as is shown in the illustrated embodiment. However, it is foreseen that the indicator structure 104 may extend downwardly only a portion of the length of the chamber 132, such as but not limited to about one quarter, one half or three quarters the length of the chamber 132, so long as the indicator structure 104 fulfills its function as is described herein.

The stem 154 includes upper and lower portions 158 and 160, respectively, separated by a rim portion 162. The stem upper portion 158 is joined with a lower surface 164 of the button 156. In the illustrated embodiment, both the upper and lower portions 158 and 160 are substantially cylindrical and coaxial with the longitudinal axis A; the length of the upper portion 158 is reduced with respect to the lower portion 160 and the lower portion 160 includes substantially reduced diameter D7 with respect to the diameter D2 of the stem upper portion 158. It is foreseen that the upper and lower portions 158 and 160 may have alternative dimensions. For example, the upper and lower portions 158 and 160 may be at least one of equal length and equal diameters; the upper portion 158 may be at least one of longer and more narrow than the lower portion 160; the upper and lower portions 158 and 160 may be conical, in part, or include a rectangular, triangular, elliptical or other shaped cross-section, the cross-section being taken perpendicular to the longitudinal axis A; or numerous combinations and variations thereof.

Referring to FIGS. 5 and 6, the stem rim portion 162 is a radially extending annular ring-like or flange-like structure with upper and lower surfaces 166 and 168 joined by a longitudinal surface 170. The rim portion upper and lower surfaces extend radially outward from the stem 154 such that they are substantially parallel and spaced from one another. The longitudinal surface 170 runs parallel to the longitudinal axis A, and nearly touches or frictionally engages the bore inner surface 130. Accordingly, the rim portion 162 includes a substantially circular cross-section with a diameter that is greater than D2 and at least slightly smaller than D1.

Referring now to FIG. 6, the diameter of the stem rim portion 162 is greater than the diameter D4 of the bore inner ring channel 144, or of the stop member 136. Accordingly, the stem rim portion 162 and the bore stop member 136 at least partially or fully overlap. For example, the rim portion upper surface 166 frictionally engages or mates with the stop member lower surface 130, thereby blocking the stem 154 from further exiting or popping up out of the bore 114. When the apparatus 100 is in the open configuration, this overlap both blocks the egress of apparatus components, which can contaminate the food item and/or cause the apparatus 100 to malfunction, and blocks the ingress of juices from the food item and into the central bore 114, which can disrupt proper functioning of the apparatus 100.

At its lower end, the stem 154 includes a foot portion 172, which engages a non-metallic high-melt plug 174 at the bottom of the chamber 132. The plug 174 is discussed in detail below. In the illustrated embodiment, the foot portion 172 is substantially conical or arrowhead-shaped with side and a top surfaces 176 and 178. Accordingly, the foot portion 172 includes a substantially triangular longitudinal cross-section and a substantially circular perpendicular cross-section that has a variable diameter. It is foreseen that the foot portion 172 may have any other shape, such as but not limited to at least one of partially spherical, ellipsoidal, cuboidal, pyramidal, conical, cylindrical, polyhedral, hemispherical and prismoidal, and may include one or more protuberances, fins, fingers, pins, coils, pores, corrugations, scoring, knurling and the like, which function to increase engagement between the stem foot portion 172 and the plug 174. It is noted that, in the closed configuration shown in FIG. 5, the tip 180 of the foot portion 172 contacts the bottom surface 152 of the lower chamber 132. However, in the open configuration, shown in FIG. 6, the foot portion tip 180 is substantially raised above the chamber bottom surface 152. In some circumstances, depending upon the volume of the lower chamber 132 and the amount of the plug material 174 used, the stem foot portion 172 may be raised above or out of the plug material 174, or at least a portion of the foot portion 172 may remain within the plug 174.

In the illustrated embodiment, the foot portion top surface 178 is substantially aligned with the bore shoulder portion 148, when the apparatus 100 is in the open configuration. It is foreseen that the top surface 178 may not be aligned with the shoulder portion 148.

As discussed above, the button indicator 156, or button, is joined with an upper end, generally 182, of the stem 154. The button indicator 156 extends radially from the stem 154, and includes top and bottom surfaces 184 and 186, respectively, joined by a rim surface 188. In the illustrated embodiment, the button indicator 156 includes a circular cross-section, taken perpendicular to the longitudinal axis A, wherein the cross-section includes a diameter that is greater than the orifice diameter D3. However, it is foreseen that the button may have any other shaped cross-section, such as but not limited to polygonal and ovular cross-sections, so long as long at it fulfills its function as described herein.

In the illustrated embodiment, since the button 156 is circular, the bottom surface 186 is substantially annular, planar and perpendicular to the longitudinal axis A. The top surface 184 is convex or dome shaped, but may alternatively be planar or even concave. Also since the button indicator 156 is circular, the rim surface 188 defines the circular perimeter thereof. In some embodiments, the rim surface 188 may run parallel with the longitudinal axis A, so as to be planar in a cross-section taken along the longitudinal axis A, such as is shown in FIGS. 5 and 6. In other embodiments, the rim surface 188 may be rounded or convex, so as to present a curvate contour. In some embodiments, at least a portion of the button 156, such as the top surface 184, is coated with a non-stick polymer or wax material, so as to block food from attaching thereto, and possibly disrupting device function. As is known in the art, such non-stick polymer or wax materials are food-safe and resistant to common cooking temperatures, such as at least about 250° F. (121.1° C.), 275° F. (135.0° C.), 300° F. (148.9° C.), 325° F. (162.8° C.), 350° F. (176.7° C.), 375° F. (190.6° C.), 400° F. (204.4° C.), 425° F. (218.3° C.), 450° F. (232.2° C.), 475° F. (246.1° C.), 500° F. (260.0° C.), 525° F. (273.8° C.), and 550° F. (287.8° C.), or more.

The flange portion 118 extends radially from the housing 108 so as to be generally perpendicular to the longitudinal axis A. In addition to lower surface 120, the flange portion 118 includes an upper surface 190. The flange portion 118 may also be coated with the non-stick material. The flange portion 118 substantially prevents the apparatus 100 from being inserted in its entirety, or too far, into the food item. For example, the flange lower surface 120 may contact or engage the food surface when the body 108 is inserted or embedded in the food item.

Referring to FIG. 5, when the apparatus 100 is in the closed configuration, the button lower surface 186 is substantially adjacent to the flange portion upper surface 190. In some embodiments, the button indicator lower surface 186 and the flange portion upper surface 190 contact one another, such that they are mated or engaged. In some embodiments, the flange portion upper surface 190 may be inwardly contoured or concave, so as to form a recess sized and shaped to receive at least a lower portion of the button 156 therein. Referring to FIG. 6, when the apparatus 100 is in the open configuration, the button lower surface 186 is spaced a distance from the flange portion upper surface 190, so as to provide the visual indication of attainment of doneness, wherein the distance between the button 156 and the flange portion 118 is sufficiently great so as to be visually detectable by a user.

The actuation subassembly 106 controls the temperature dependent pop up action of the button indicator 156. The actuation subassembly 106 includes the biasing member 150 and the food safe, non-metallic high-melt plug 174 described above. The biasing member 150 is a structure that biases the stem 154 away from the lower chamber 132. In the embodiment of FIGS. 1-6, the biasing member 150 is a spring 192 with upper and lower ends 194 and 196 formed of a non-metallic filament or thread that has a square or rectangular cross-section. The spring 192 may be fabricated of any food-safe polymer known in the art that is flexible and resilient, and optionally elastic. The spring 192 is resistant to high cooking temperatures, such as but not limited to about 550° F. (287.8° C.), so as to not loose structural integrity when cooked.

The spring 192 is received around the stem lower portion 160 such that its upper end 194 engages the stem rim portion lower surface 168 and its lower end 196 engages the bore shoulder portion 148. Thus, when the apparatus 100 is in the closed configuration, the spring 192 is compressed between the bore shoulder portion 148 and the stem rim portion lower surface 168. This compression gives the spring 192 sufficient stored potential energy to make the button 156 pop up when the particular temperature is reached, such as is further described below. When the apparatus 100 is in the open configuration, the spring 192 is in an at least partially relaxed state relative to when the device 100 is closed and depending upon the size, shape and fabrication material of the spring 192 and the distance between the bore shoulder portion 148 and the stem rim portion lower surface 168, such as is known in the art.

The non-metallic high-melt plug 174 is a non-metallic, food-safe wax or polymer that softens or melts when the particular temperature is reached, such as but not limited to a temperature of at least about 140° F. (60.0° C.), 145° F. (62.8° C.), 150° F. (65.6° C.), 155° F. (68.3° C.), 160° F. (71.1° C.), 165° F. (73.9° C.), 170° F. (76.7° C.), 175° F. (79.4° C.), 180° F. (82.2° C.), 185° F. (85.0° C.), 190° F. (87.8° C.) or higher. Prior to reaching the particular temperature, the plug 174 is substantially solid, hardened or fused. The solid plug 174 surrounds and engages the stem foot portion 172 and holds down the stem foot portion 172, so that the spring 192 is compressed, such as is shown in FIG. 5.

When the particular temperature is reached or achieved, the plug 174 softens, or melts, an amount sufficient to release the stem foot portion 172. Softened plug material is denoted by the numeral 174A. Since the stem foot portion 172 is no longer held down by the melted plug 174A, the spring 192 releases its stored potential energy by moving to the more relaxed configuration, such as is shown in FIG. 6. As the spring 192 moves toward the open configuration of FIG. 6, it pushes upon both the bore shoulder portion 148 and the stem rim portion lower surface 168, thereby pushing the shoulder portion 148 and the lower surface 168 away from one another. As a result, the foot portion 172 is raised out of the melted plug material 174A and the button indicator 156 is simultaneously lifted away from the flange portion 118, so as to indicate that the food item is done. In FIGS. 2, 3 and 4 is shown the process of assembly of the apparatus 100. In FIG. 1 the apparatus 100 is shown in an exploded view. FIGS. 2-4 show the apparatus 100 in cross section while moving from the open configuration seen in FIG. 2 to the closed configuration seen in FIG. 4. The apparatus in FIG. 2 is placed in a chamber 199 with a fluid 197. A structure 198 is applied to the button indicator 156, as shown in FIG. 3 to push the indicator 159 downwardly relative to the body 108 until the plug material 174 melts and then resolidifies around the foot portion 172, as seen in FIG. 4 to hold the button indicator 156 in the closed configuration as the plug material 174 cools.

FIGS. 8 and 9 illustrate the non-metallic doneness indicator in a second embodiment denoted generally by the numeral 200, which is similar to the non-metallic doneness indicator 100 of the first embodiment, the description of which is incorporated herein by reference. FIGS. 8 and 9 show the doneness indicator 200 in the closed and open configurations, respectively, such as is described above with respect to the doneness indicator 100. The closed configuration, shown in FIG. 8, is associated with the food not having attained the specific temperature, and therefore the food is not done. The open configuration, shown in FIG. 9, is associated with the food having attained the specific temperature, such that the food item is done, such as is described above with respect to the apparatus 100.

The apparatus 200 includes a longitudinal axis B, a longitudinally extending housing 202, a movable indicator structure 204, and an actuation subassembly, generally 206, that causes the indicator structure 204 to pop up when the food is done. When the food item has reached a specific internal temperature associated with doneness, the indicator structure 204 cooperates with the housing 202 so as to pop up and thereby provide a visually detectable indicator of food doneness.

The apparatus housing 202 includes a barrel-like body 208 that extends along the longitudinal axis B from an open first end 210 to a closed second end 212. The body 208 includes a centrally located longitudinal bore 214 that is coaxial with the longitudinal axis B. The first end 210 includes an orifice 216 and a radially extending flange portion 218. The orifice 216 joins the bore 214 with the exterior portion 219 of the body 208.

When in use, the substantially cylindrical body 208 is inserted into the food item until a lower surface 220 of the flange 218 contacts the surface of the food. The flange 218 provides an enlarged structure that substantially prevents the entire device 200 from being completely inserted or embedded into the food. The closed second end 212 is sized and shaped for piercing the food object. In the illustrated embodiment, the second end 212 is conical and pointed. However, it is foreseen that the second end 212 may be blunt, flat or semi-spherical, or may have numerous other shapes.

The body exterior portion 219 includes one or more outwardly extending fins 222, pins or barbs. The fins 222 are adapted for embedding themselves in the food item, after the apparatus 200 has been inserted into the food item, so as to prevent or resist removal of the apparatus 200 from the food object. In the illustrated embodiment, the fins 222 are spaced from both the housing first and second ends 210 and 212. However, it is foreseen that the fins 222 may be located relatively closer to either of the first and second ends 210 and 212. In some embodiments, the fins 222 are located so close to the second end 212 that the second end 212 includes the fins 222, which facilitates piercing of the food item by the second end 212. In some embodiments, the fins 222 are located so close to the first end 210 that the first end 210 includes the fins 222. In still other embodiments, the apparatus 200 lacks fins entirely.

In the illustrated embodiment of FIGS. 8 and 9, each of the fins 222 includes a pair of opposed faces that are similar to the faces 124 and that are joined by a forward surface portion 226 and a rear surface portion 228. Each of the fins 222 includes a generally triangular cross-section, wherein the cross-section is taken parallel to the longitudinal axis B and evenly separates the faces. In some embodiments, the faces are spaced, planar and run parallel with one another and the longitudinal axis B, such that the fins 222 are substantially thin and flat. In other embodiments, the rear surface portion 228 includes a width that is wider than a width of the forward surface portion 226, such that the fins 222 widen progressively from the forward surface portion 226 toward the rear surface portion 228, so as to form a wedge-shape. It is foreseen that the faces of the fins 222 may also be outwardly bowed. Numerous variations are foreseen.

The central bore 214 extends downwardly from the orifice 216 and longitudinally within the body 208 such that it is coaxial with the longitudinal axis B. The bore 214 includes a curvate inner surface 230 and a lower chamber 232. In the illustrated embodiment, the bore 214 includes a circular cross-section with a first diameter D8, wherein the cross-section is taken perpendicular to the longitudinal axis B. A plurality of bore cross-sections may be taken along the length of the bore 214, or along the longitudinal axis B, wherein each of the cross-sections includes a diameter D8, which, for example, may be denoted as $D8_1$, $D8_2$, $D8_3$, . . . , and $D8_n$, wherein n is an integer associated with one of the plurality of bore cross-sections taken. It is noted that the diameters $D8_n$ of the plurality of bore cross-sections may be equal, such as if the bore 214 is cylindrical along its entire length. Alternatively, the diameters D8, may vary in size continuously or intermittently along at least a portion of the length of the bore 214, such as if the bore 214 includes two cylindrical portions of different diameters $D8_n$, or such as if the bore 214 is at least partial conical or otherwise shaped. However, with the exception of certain portions of the apparatus 200 discussed below, each of the bore cross-section diameters $D8_n$ is substantially greater than a second diameter D9 of a perpendicular cross-section of the portion of the indicator structure 204 that must pass therethrough. In FIGS. 8 and 9, D8 is greater than D9.

The orifice 216 is located at the housing first end 210 and joins the central bore 214 with the housing exterior portion 219. The orifice 216 is sized and shaped to slidingly receive at least a portion of the indicator structure 204 therethrough. In the illustrated embodiment, the orifice is circular, with a diameter D10, wherein D10 is greater than D9. Accordingly, the indicator structure 204, which includes the diameter D9, can slidingly move through the orifice 216, or pop up, such as from the closed configuration of FIG. 8 to the open configuration of FIG. 9.

Near the orifice 216, the bore 214 includes a flange-like stop member 236 that cooperates with a portion of the indicator structure 204, described below, to prevent the indicator structure 204 from popping completely out of the bore 214, such as when the indicator structure pops up. In the illustrated embodiment, the stop member 236 is located within the bore 214 and spaced a small distance from the orifice 216. It is foreseen that the stop member 236 may be located at the orifice 216 or at the second end 212. In some embodiments, the orifice 216 includes the stop member 236. In other exemplary embodiments, the second end 212 includes the stop member 236. In still other embodiments, the apparatus 200 lacks a stop member 236.

In the illustrated embodiment, the stop member 236 is an inwardly extending ring, shelf, shoulder or flange that includes a pair of longitudinally spaced upper and lower annular surfaces 238 and 240 joined with a third surface 242 that forms an inner ring channel 244. The inner ring channel 244 includes a circular cross-section with a diameter D11, wherein the cross-section is taken perpendicular to the longitudinal axis B. As shown in FIG. 8, the diameter D11 of the inner ring channel 244 is smaller than the diameter D8 of the bore 214, yet the diameter D11 is at least slightly greater than a diameter D12 of the indicator structure 204 upper portion, which pops up through the inner ring channel 244 when doneness is achieved.

Referring now to FIGS. 8 and 9, the lower chamber 232 is located at the housing closed second end 212 and is substantially coaxial with the longitudinal axis B. In the illustrated embodiment, the chamber 232 is substantially cylindrical with a circular cross-section having a diameter D13, wherein the cross-section is taken perpendicular to the longitudinal axis B. In the illustrated embodiment, the chamber diameter D13 is reduced with respect to the diameter D8 of the portion of the bore 214 that extends upwardly from the chamber 232, said upwardly extending portion being denoted generally by the numeral 246. It is foreseen that the chamber diameter D13 may be equal to or greater than the diameter D8 of said upwardly extending portion 246 of the bore 214.

An inwardly extending shoulder portion 248 joins the bore upwardly extending portion 246 with the chamber 232. In the illustrated embodiment, the shoulder portion 248 is planar and runs substantially perpendicular to the longitudinal axis B, so as to form an inner annular ring or shelf with an inner diameter equal to the diameter D13 of the chamber and an outer diameter equal to about D8. It is foreseen that the shoulder portion 248 may also be conical or sloped, such as with a progressively reduced inner diameter when moving away from the first end 210 and towards the second end 212, so as to slope downwardly into the chamber 232. As is discussed below, the shoulder portion 248 frictionally engages a lower end of a biasing member 250, which is part of the actuation subassembly 206. At its lower end, the bottom surface 252 of the chamber 232 may be flat, concave, conical, a combination thereof, or otherwise contoured.

The indicator structure 204 cooperates with the housing 202 to indicate attainment of the particular temperature associated with the doneness of the food item. To do so, the indicator structure 204 moves from the closed configuration of FIG. 8 to the open configuration of FIG. 9. The indicator structure 204 includes a longitudinally extending stem 254 and an indicator button 256. The stem 254 is slidingly received into the bore 214 through the orifice 216. When the apparatus 200 is closed, the indicator structure 204 extends from the orifice 216 to substantially near the chamber bottom surface 252, and may contact or touch the bottom surface 252, such as is shown in the illustrated embodiment. However, it is foreseen that the indicator structure 204 may extend downwardly only a portion of the length of the chamber 232, such as but not limited to about one quarter, one half or three quarters the length of the chamber 232, so long as the indicator structure 204 fulfills its function as is described herein.

The stem 254 includes upper and lower portions 258 and 260, respectively, separated by a rim portion 262. The stem upper portion 258 is joined with a lower surface 264 of the button 256. In the illustrated embodiment, both the upper and lower portions 258 and 260 are substantially cylindrical and coaxial with the longitudinal axis B; the length of the upper portion 258 is reduced with respect to the lower portion 260 and the lower portion 260 includes substantially reduced diameter D14 with respect to the diameter D9 of the stem upper portion 258. It is foreseen that the upper and lower portions 258 and 260 may have alternative dimensions, such as is described with respect to the device 100.

The stem rim portion 262 is a radially extending annular ring-like or flange-like structure with upper and lower surfaces 266 and 268 joined by a longitudinal surface 270. The rim portion upper and lower surfaces extend radially outward from the stem 254 such that they are substantially parallel and spaced from one another. The longitudinal surface 270 runs parallel to the longitudinal axis B, and nearly touches or frictionally engages the bore inner surface 230. Accordingly, the rim portion 262 includes a substantially circular cross-section with a diameter that is greater than D9 and at least slightly smaller than D8.

The diameter of the stem rim portion 262 is greater than the diameter D11 of the bore inner ring channel 244, or of the stop member 236. Accordingly, the stem rim portion 262 and the bore stop member 236 at least partially or fully overlap. For example, the rim portion upper surface 266 frictionally engages or mates with the stop member lower surface 230, thereby blocking the stem 254 from further exiting or popping up out of the bore 214.

At its lower end, the stem 254 includes a foot portion 272, which engages a non-metallic high-melt plug 274 at the bottom of the chamber 232. The plug 274 is discussed in detail below. In the illustrated embodiment, the foot portion 272 is substantially conical or arrowhead-shaped with side and a top surfaces 276 and 278. Accordingly, the foot portion 272 includes a substantially triangular longitudinal cross-section and a substantially circular perpendicular cross-section that has a variable diameter. It is foreseen that the foot portion 272 may have any other shape so long as long at it fulfills its function as described herein. It is noted that, in the closed configuration shown in FIG. 8, the tip 280 of the foot portion 272 contacts the bottom surface 252 of the lower chamber 232. However, in the open configuration, shown in FIG. 9, the foot portion tip 280 is substantially raised above the chamber bottom surface 252. In some circumstances, depending upon the volume of the lower chamber 232 and the amount of the plug material 274 used, the stem foot portion 272 may be raised above or out of the plug material 274, or at least a portion of the foot portion 272 may remain within the plug 274.

In the illustrated embodiment, the foot portion top surface 278 is substantially aligned with the bore shoulder portion 248, when the apparatus 200 is in the open configuration. It is foreseen that the top surface 278 may not be aligned with the shoulder portion 248.

The button indicator 256, or button, is joined with an upper end, generally 282, of the stem 254. The button indicator 256 extends radially from the stem 254, and includes top and bottom surfaces 284 and 286, respectively, joined by a rim surface 288. In the illustrated embodiment, the button indicator 256 includes a circular cross-section, taken perpendicular to the longitudinal axis B, wherein the cross-section includes a diameter that is greater than the orifice diameter D10. However, it is foreseen that the button may have any other shaped cross-section, such as but not limited to polygonal and ovular cross-sections, so long as long at it fulfills its function as described herein.

The button 256 bottom surface 286 is substantially annular, planar and perpendicular to the longitudinal axis B. The top surface 284 is convex or dome shaped, but may alternatively be planar or even concave. The rim surface 288 defines the circular perimeter thereof. The rim surface 288 may be planar and run parallel with the longitudinal axis B, or it may be rounded or convex, so as to present a curvate contour. At least a portion of the button 256 may be coated with a non-stick polymer or wax material, such as is described elsewhere herein.

The flange portion 218 extends radially from the housing 208 so as to be generally perpendicular to the longitudinal axis B. In addition to lower surface 220, the flange portion 218 includes an upper surface 290. The flange portion 218 may also be coated with the non-stick material. The flange portion 218 substantially prevents the apparatus 200 from being inserted in its entirety, or too far, into the food item. For example, the flange lower surface 220 may contact or engage the food surface when the body 208 is inserted or embedded in the food item.

When the apparatus 200 is in the closed configuration, the button lower surface 286 is substantially adjacent to the flange portion upper surface 290. In some embodiments, the button indicator lower surface 286 and the flange portion upper surface 290 contact one another, such that they are mated or engaged. In some embodiments, the flange portion upper surface 290 may be inwardly contoured or concave, so as to form a recess sized and shaped to receive at least a lower portion of the button 256 therein.

When the apparatus 200 is in the open configuration, the button lower surface 286 is spaced a distance from the flange portion upper surface 290, so as to provide the visual indication of attainment of doneness, wherein the button 256 and the flange portion 218 are spaced a distance sufficiently great so as to be visually detectable by a user.

The actuation subassembly 206 controls the temperature dependent pop up action of the button indicator 256. The actuation subassembly 206 includes the biasing member 250 and the food safe, non-metallic high-melt plug 274 described above. The biasing member 250 is a structure that biases the stem 254 away from the lower chamber 232. In the embodiment of FIGS. 8 and 9, the biasing member 250 is a cylinder 292 is fabricated of any food-safe polymer known in the art that is flexible and resilient, and optionally elastic. The cylinder 292 is resistant to high cooking temperatures, such as but not limited to about 550° F. (287.8° C.), so as to not loose structural integrity when cooked.

The cylinder 292 includes upper and lower ends 294 and 296, a smooth cylindrical outer surface 292A and a cylindrical through-bore 292B. The through-bore 292B is coaxial with the longitudinal axis B and includes a smooth cylindrical inner surface 292C that joins the upper and lower ends 294 and 296.

The stem lower portion 260 is received through the cylinder through-bore 292B. In the assembled device 200, the cylinder upper end 294 engages the stem rim portion lower surface 268. Similarly, the cylinder lower end 296 engages the bore shoulder portion 248. When the apparatus 200 is in the closed configuration, the cylinder 292 is compressed between the bore shoulder portion 248 and the stem rim portion lower surface 268. Additionally, when compressed, the cylinder outer surface 292A contacts, engages or presses against the bore inner surface 230 and the cylinder through-bore inner surface 292C contacts, engages or presses against the outer surface 260A of the stem lower portion 260. Similar to the spring 192, this compression gives the cylinder 292 sufficient stored potential energy to make the button 256 pop up when the particular temperature is reached, such as is further described below.

When the apparatus 200 is in the open configuration, the cylinder 292 is in an at least partially relaxed state relative to when the device 200 is closed and depending upon the size, shape and fabrication material of the cylinder 292 and the distance between the bore shoulder portion 248 and the stem rim portion lower surface 268, such as is known in the art. It is noted that the cylinder outer surface 292A is spaced from the bore inner surface 230 and the cylinder through-bore inner surface 292C is spaced from the outer surface 260A of the stem lower portion 260.

The non-metallic high-melt plug 274 is substantially identical to the plug 174 described above. Prior to reaching the particular temperature, the plug 274 is substantially solid, hardened or fused. The solid plug 274 surrounds and engages the stem foot portion 272 and holds down the stem foot portion 272, so that the cylinder 292 is compressed, such as is shown in FIG. 8.

When the particular temperature is reached or achieved, the plug 274 softens, or melts, an amount sufficient to release the stem foot portion 272. Softened plug material is denoted by the numeral 274A. Since the stem foot portion 272 is no longer held down by the melted plug 274A, the cylinder 292 releases its stored potential energy by moving to the more relaxed configuration, such as is shown in FIG. 9. As the cylinder 292 moves toward the open configuration of FIG. 9, it pushes upon both the bore shoulder portion 248 and the stem rim portion lower surface 268, thereby pushing the shoulder portion 248 and the lower surface 268 away from one another. As a result, the foot portion 272 is raised out of the melted plug material 274A and the button indicator 256 is simultaneously lifted away from the flange portion 218, so as to indicate that the food item is done.

Figures 10, 11:
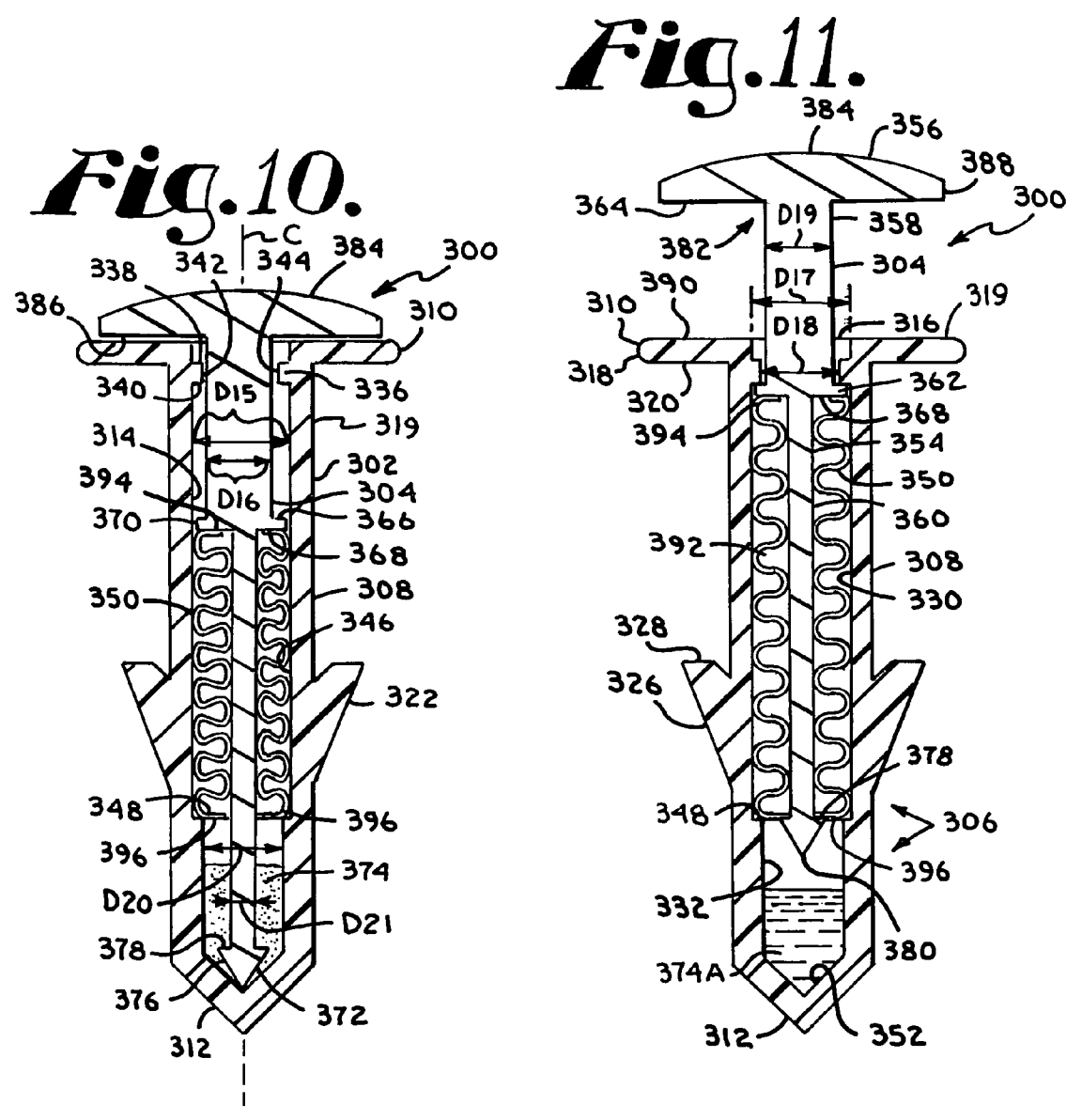

FIGS. 10 and 11 illustrate the non-metallic doneness indicator in a third embodiment denoted generally by the numeral 300, which is similar to the non-metallic doneness indicator 100 of the first embodiment, the description of which is incorporated herein by reference. FIGS. 10 and 11 show the doneness indicator 300 in the closed and open configurations, respectively, such as is described above with respect to the doneness indicator 100. The closed configuration, shown in FIG. 10, is associated with the food not having attained the specific temperature, and therefore the food is not done, while the open configuration, shown in FIG. 11, is associated with the food having attained the specific temperature, such that the food item is done, such as is described above with respect to the apparatus 100.

The apparatus 300 includes a longitudinal axis C, a longitudinally extending housing 302, a movable indicator structure 304 sized and shaped, or adapted, to cooperate with the housing 302 so as to pop up when the food is done and thereby provide a visually detectable indicator of food doneness, and an actuation subassembly, generally 306, that causes the indicator structure 304 to pop up when the food is done.

The apparatus 300 includes a longitudinal axis C, a longitudinally extending housing 302, a movable indicator structure 304, and an actuation subassembly, generally 306, that causes the indicator structure 304 to pop up when the food is done. When the food item has reached a specific internal temperature associated with doneness, the indicator structure 304 cooperates with the housing 302 so as to pop up and thereby provide a visually detectable indicator of food doneness.

The apparatus housing 302 is substantially similar to the housings 102 and 202. Accordingly, the housing 302 includes a barrel-like body 308 that extends along the longitudinal axis C from an open first end 310 to a closed second end 312. The body 308 includes a centrally located longitudinal bore 314 that is coaxial with the longitudinal axis C. The first end 310 includes an orifice 316 and a radially extending flange portion 318. The orifice 316 joins the bore 314 with the exterior portion 319 of the body 308.

When in use, the substantially cylindrical body 308 is inserted into the food item until a lower surface 320 of the flange 318 contacts the surface of the food. The flange 318 provides an enlarged structure that substantially prevents the entire device 300 from being completely inserted or embedded into the food. The closed second end 312 is sized and shaped for piercing the food object. In the illustrated embodiment, the second end 312 is conical and pointed. However, it is foreseen that the second end 312 may be blunt, flat or semi-spherical, or may have numerous other shapes.

The body exterior portion 319 includes one or more outwardly extending fins 322, pins or barbs similar to the fins 122 and 222. In the illustrated embodiment, the fins 322 are spaced from both the housing first and second ends 310 and 312. However, it is foreseen that the fins 322 may be located relatively closer to either of the first and second ends 310 and 312. In still other embodiments, the apparatus 300 lacks fins entirely.

In the illustrated embodiment of FIGS. 10 and 11, each of the fins 322 includes a pair of opposed faces that are similar to the faces 124 and that are joined by a forward surface portion 326 and a rear surface portion 328. Each of the fins 322 includes a generally triangular cross-section, wherein the cross-section is taken parallel to the longitudinal axis C and evenly separates the faces. In some embodiments, the faces are spaced, planar and run parallel with one another and the longitudinal axis C, such that the fins 322 are substantially thin and flat. In other embodiments, the rear surface portion 328 includes a width that is wider than a width of the forward surface portion 326, such that the fins 322 are wedge-shaped. Numerous variations of the fins 322 are foreseen.

The central bore 314 extends downwardly from the orifice 316 and longitudinally within the body 308 such that it is coaxial with the longitudinal axis C. The bore 314 includes a curvate inner surface 330 and a lower chamber 332. In the illustrated embodiment, the bore 314 includes a circular cross-section with a first diameter D15, wherein the cross-section is taken perpendicular to the longitudinal axis C. Similar to the bore 114, a plurality of bore cross-sections may be taken along the length of the bore 314, or along the longitudinal axis C, wherein each of the cross-sections includes a diameter D15, which, for example, may be denoted as $D15_1$, $D15_2$, $D15_2$, ..., and $D15_n$, wherein n is an integer associated with one of the plurality of bore cross-sections taken. It is noted that the diameters $D15_n$ of the plurality of bore cross-sections may be equal, such as if the bore 314 is cylindrical along its entire length. Alternatively, the diameters D15, may vary in size continuously or intermittently along at least a portion of the length of the bore 314, such as if the bore 314 includes two cylindrical portions of different diameters $D15_n$, or such as if the bore 314 is at least partial conical or otherwise shaped. However, with the exception of certain portions of the apparatus 300 discussed below, each of the bore cross-section diameters D15, is substantially greater than a second diameter D16 of a perpendicular cross-section of the portion of the indicator structure 304 that must pass therethrough. In FIGS. 10 and 11, D15 is greater than D16.

The orifice 316 is located at the housing first end 310 and joins the central bore 314 with the housing exterior portion 319. The orifice 316 is sized and shaped to slidingly receive at least a portion of the indicator structure 304 therethrough. In the illustrated embodiment, the orifice is circular, with a diameter D17, wherein D17 is greater than D16. Accordingly, the indicator structure 304, which includes the diameter D16, can slidingly move through the orifice 316, or pop up, such as from the closed configuration of FIG. 10 to the open configuration of FIG. 11.

Near the orifice 316, the bore 314 includes a flange-like stop member 336 that cooperates with a portion of the indicator structure 304, described below, to prevent the indicator structure 304 from popping completely out of the bore 314, such as when the indicator structure pops up. In the illustrated embodiment, the stop member 336 is located within the bore 314 and spaced a small distance from the orifice 316. It is foreseen that the stop member 336 may be located at the orifice 316 or at the second end 312. In some embodiments, the orifice 316 includes the stop member 336. In other exemplary embodiments, the second end 312 includes the stop member 336. In still other embodiments, the apparatus 300 lacks a stop member 236.

In the illustrated embodiment, the stop member 336 is an inwardly extending ring, shelf, shoulder or flange that includes a pair of longitudinally spaced upper and lower annular surfaces 338 and 340 joined with a third surface 342 that forms an inner ring channel 344. The inner ring channel 344 includes a circular cross-section with a diameter D18, wherein the cross-section is taken perpendicular to the longitudinal axis C. As shown in FIG. 10, the diameter D18 of the inner ring channel 344 is smaller than the diameter D15 of the bore 314, yet the diameter D18 is at least slightly greater than a diameter D19 of the indicator structure 304 upper portion, which pops up through the inner ring channel 344 when doneness is achieved.

Referring now to FIGS. 10 and 11, the bore 314 includes the lower chamber 332, which is located at the housing closed second end 312 and is substantially coaxial with the longitudinal axis C. In the illustrated embodiment, the chamber 332 is substantially cylindrical with a circular cross-section having a diameter D20, wherein the cross-section is taken perpendicular to the longitudinal axis C. In the illustrated embodiment, the chamber diameter D20 is reduced with respect to the diameter D15 of the portion of the bore 314 that extends upwardly from the chamber 332, said upwardly extending portion being denoted generally by the numeral 346. It is foreseen that the chamber diameter D20 may be equal to or greater than the diameter D15 of said upwardly extending portion 346 of the bore 314.

An inwardly extending shoulder portion 348 joins the bore upwardly extending portion 346 with the chamber 332. In the illustrated embodiment, the shoulder portion 348 is planar and runs substantially perpendicular to the longitudinal axis C, so as to form an inner annular ring or shelf with an inner diameter equal to the diameter D20 of the chamber and an outer diameter equal to about D15. It is foreseen that the shoulder portion 348 may also be conical or sloped, such as with a progressively reduced inner diameter when moving away from the first end 310 and towards the second end 312, so as to slope downwardly into the chamber 332. As is discussed below, the shoulder portion 348 frictionally engages a lower end of a biasing member 350, which is part of the actuation subassembly 306. At its lower end, the bottom surface 352 of the chamber 332 may be flat, concave, conical, a combination thereof, or otherwise contoured.

The indicator structure 304 cooperates with the housing 302 to indicate attainment of the particular temperature associated with the doneness of the food item. To do so, the indicator structure 304 moves from the closed configuration of FIG. 10 to the open configuration of FIG. 11. The indicator structure 304 includes a longitudinally extending stem 354 and an indicator button 356. The stem 354 is slidingly received into the bore 314 through the orifice 316. When the apparatus 300 is closed, the indicator structure 304 extends from the orifice 316 to substantially near the chamber bottom surface 352, and may contact or touch the bottom surface 352, such as is shown in the illustrated embodiment. However, it is foreseen that the indicator structure 304 may extend downwardly only a portion of the length of the chamber 332, such as but not limited to about one quarter, one half or three quarters the length of the chamber 332, so long as the indicator structure 304 fulfills its function as is described herein.

The stem 354 includes upper and lower portions 358 and 360, respectively, separated by a rim portion 362. The stem upper portion 358 is joined with a lower surface 364 of the button 356. In the illustrated embodiment, both the upper and lower portions 358 and 360 are substantially cylindrical and coaxial with the longitudinal axis C; the length of the upper portion 358 is reduced with respect to the lower portion 360 and the lower portion 360 includes substantially reduced diameter D21 with respect to the diameter D16 of the stem upper portion 358. It is foreseen that the upper and lower portions 358 and 360 may have alternative dimensions, such as is described with respect to the device 100.

The stem rim portion 362 is a radially extending annular ring-like or flange-like structure with upper and lower surfaces 366 and 368 joined by a longitudinal surface 370. The rim portion upper and lower surfaces extend radially outward from the stem 354 such that they are substantially parallel and spaced from one another. The longitudinal surface 370 runs parallel to the longitudinal axis C, and nearly touches or frictionally engages the bore inner surface 330. Accordingly, the rim portion 362 includes a substantially circular cross-section with a diameter that is greater than D16 and at least slightly smaller than D15.

The diameter of the stem rim portion 362 is greater than the diameter D18 of the bore inner ring channel 344, or of the stop member 336. Accordingly, the stem rim portion 362 and the bore stop member 336 at least partially or fully overlap. For example, the rim portion upper surface 366 frictionally engages or mates with the stop member lower surface 330, thereby blocking the stem 354 from further exiting or popping up out of the bore 314.

At its lower end, the stem 354 includes a foot portion 372, which engages a non-metallic high-melt plug 374 at the bottom of the chamber 332. The plug 374 is discussed in detail below. In the illustrated embodiment, the foot portion 372 is substantially conical or arrowhead-shaped with side and a top surfaces 376 and 378. Accordingly, the foot portion 372 includes a substantially triangular longitudinal cross-section and a substantially circular perpendicular cross-section that has a variable diameter. It is foreseen that the foot portion 372 may have any other shape so long as long at it fulfills its function as described herein. It is noted that, in the closed configuration shown in FIG. 10, the tip 380 of the foot portion 372 contacts the bottom surface 352 of the lower chamber 332. However, in the open configuration, shown in FIG. 11, the foot portion tip 380 is substantially raised above the chamber bottom surface 352. In some circumstances, depending upon the volume of the lower chamber 332 and the amount of the plug material 374 used, the stem foot portion 372 may be raised above or out of the plug material 374, or at least a portion of the foot portion 372 may remain within the plug 374.

In the illustrated embodiment, the foot portion top surface 378 is substantially aligned with the bore shoulder portion 348, when the apparatus 300 is in the open configuration. It is foreseen that the top surface 378 may not be aligned with the shoulder portion 348.

The button indicator 356, or button, is joined with an upper end, generally 382, of the stem 354. The button indicator 356 extends radially from the stem 354, and includes top and bottom surfaces 384 and 386, respectively, joined by a rim surface 388. In the illustrated embodiment, the button indicator 356 includes a circular cross-section, taken perpendicular to the longitudinal axis C, wherein the cross-section includes a diameter that is greater than the orifice diameter D17. However, it is foreseen that the button may have any other shaped cross-section, such as but not limited to polygonal and ovular cross-sections, so long as long at it fulfills its function as described herein.

The button 356 bottom surface 386 is substantially annular, planar and perpendicular to the longitudinal axis C. The top surface 384 is convex or dome shaped, but may alternatively be planar or even concave. The rim surface 388 defines the circular perimeter thereof. The rim surface 388 may be planar and run parallel with the longitudinal axis C, or it may be rounded or convex, so as to present a curvate contour. At least a portion of the button 356 may be coated with a non-stick polymer or wax material, such as is known in the art.

The flange portion 318 extends radially from the housing 308 so as to be generally perpendicular to the longitudinal axis C. In addition to lower surface 320, the flange portion 318 includes an upper surface 390. The flange portion 318 may also be coated with the non-stick material. The flange portion 318 substantially prevents the apparatus 300 from being inserted in its entirety, or too far, into the food item. For example, the flange lower surface 320 may contact or engage the food surface when the body 308 is inserted or embedded in the food item.

When the apparatus 300 is in the closed configuration, the button lower surface 386 is substantially adjacent to the flange portion upper surface 390. In some embodiments, the button indicator lower surface 386 and the flange portion upper surface 390 contact one another, such that they are mated or engaged. In some embodiments, the flange portion upper surface 390 may be inwardly contoured or concave, so as to form a recess sized and shaped to receive at least a lower portion of the button 356 therein.

When the apparatus 300 is in the open configuration, the button lower surface 386 is spaced a distance from the flange portion upper surface 390, so as to provide the visual indication of attainment of doneness, wherein the button 356 and the flange portion 318 are spaced a distance sufficiently great so as to be visually detectable by a user.

The actuation subassembly 306 controls the temperature dependent pop up action of the button indicator 356. The actuation subassembly 306 includes the biasing member 350 and the food safe, non-metallic high-melt plug 374 described above. The biasing member 350 is a structure that biases the stem 354 away from the lower chamber 332. In the embodiment of FIGS. 10 and 11, the biasing member 350 is a corrugated tube 392. The corrugated tube 392 may be fabricated of any food-safe polymer known in the art that is flexible and resilient, and optionally elastic. The corrugated tube 392 is resistant to high cooking temperatures, such as but not limited to about 550° F. (287.8° C.), so as to not loose structural integrity when cooked.

The corrugated tube 392 includes upper and lower ends 394 and 396, a smooth, curvate or contoured outer surface 392A and a corrugated through-bore 392B. The through-bore 392B is coaxial with the longitudinal axis C and includes a smooth curvate or contoured inner surface 392C that joins the upper and lower ends 394 and 396.

The stem lower portion 360 is received through the cylinder through-bore 392B. In the assembled device 300, the cylinder upper end 394 engages the stem rim portion lower surface 368. Similarly, the cylinder lower end 396 engages the bore shoulder portion 348. Thus, when the apparatus 300 is in the closed configuration, the corrugated tube 392 is compressed between the bore shoulder portion 248 and the stem rim portion lower surface 268. Similar to the spring 192, this compression gives the corrugated tube 392 sufficient stored potential energy to make the button 356 pop up when the particular temperature is reached, such as is further described below. When the apparatus 300 is in the open configuration, the corrugated tube 392 is in an at least partially relaxed state relative to when the device 300 is closed and depending upon the size, shape and fabrication material of the corrugated tube 392 and the distance between the bore shoulder portion 348 and the stem rim portion lower surface 368, such as is known in the art.

The non-metallic high-melt plug 374 is substantially identical to the plug 174 described above. Prior to reaching the particular temperature, the plug 374 is substantially solid, hardened or fused. The solid plug 374 surrounds and engages the stem foot portion 372 and holds down the stem foot portion 372, so that the corrugated tube 392 is compressed, such as is shown in FIG. 10.

When the particular temperature is reached or achieved, the plug 374 softens, or melts, an amount sufficient to release the stem foot portion 372. Softened plug material is denoted by the numeral 374A. Since the stem foot portion 372 is no longer held down by the melted plug 374A, the corrugated tube 392 releases its stored potential energy by moving to the more relaxed configuration, such as is shown in FIG. 11. As the corrugated tube 392 moves toward the open configuration of FIG. 11, it pushes upon both the bore shoulder portion 348 and the stem rim portion lower surface 368, thereby pushing the shoulder portion 348 and the lower surface 368 away from one another. As a result, the foot portion 372 is raised out of the melted plug material 374A and the button indicator 356 is simultaneously lifted away from the flange portion 318, so as to indicate that the food item is done.

FIGS. 12 and 13 illustrate the non-metallic doneness indicator in a fourth embodiment denoted generally by the numeral 400, which is similar to the non-metallic doneness indicator 100 of the first embodiment, the description of which is incorporated herein by reference. FIGS. 12 and 13 show the doneness indicator 400 in the closed and open configurations, respectively, such as is described above with respect to the doneness indicator 100. The closed configuration, shown in FIG. 12, is associated with the food not having attained the specific temperature, and therefore the food is not done, while the open configuration, shown in FIG. 13, is associated with the food having attained the specific temperature, such that the food item is done, such as is described above with respect to the apparatus 100.

The apparatus 400 includes a longitudinal axis D, a longitudinally extending housing 402, a movable indicator structure 404 sized and shaped to cooperate with the housing 402 so as to pop up when the food is done and thereby provide a visually detectable indicator of food doneness, and an actuation subassembly, generally 406, that causes the indicator structure 404 to pop up when the food is done.

The apparatus housing 402 includes a barrel-like body 408 that extends along the longitudinal axis D from an open first end 410 to a closed second end 412. The body 408 includes a centrally located longitudinal bore 414 that is coaxial with the longitudinal axis D. The first end 410 includes an orifice 416 and a radially extending flange portion 418. The orifice 416 joins the bore 414 with the exterior portion 419 of the body 408.

When in use, the substantially cylindrical body 408 is inserted into the food item until a lower surface 420 of the flange 418 contacts the surface of the food. The flange 418 provides an enlarged structure that substantially prevents the entire device 400 from being completely inserted or embedded into the food. The closed second end 412 is sized and shaped for piercing the food object. In the illustrated embodiment, the second end 412 is substantially conical and pointed. However, it is foreseen that the second end 412 may be blunt, flat or semi-spherical, or may have numerous other shapes.

The body exterior portion 419 includes one or more outwardly extending fins 422, pins or barbs similar to the fins 122, 222 and 322. In the illustrated embodiment, the fins 422 are located at the second end 412, such that the second end 412 includes the fins 422. However, it is foreseen that the fins 422 may be spaced from both the housing first and second ends 410 and 412 or located relatively closer to the first end 410. In still other embodiments, the apparatus 400 lacks fins entirely.

In the illustrated embodiment of FIGS. 12 and 13, each of the fins 422 includes a pair of opposed faces that are similar to the faces 124 and that are joined by a forward surface portion 426 and a rear surface portion 428. Each of the fins 422 includes a generally triangular cross-section, wherein the cross-section is taken parallel to the longitudinal axis D and evenly separates the faces. In some embodiments, the faces are spaced, planar and run parallel with one another and the longitudinal axis D, such that the fins 422 are substantially thin and flat. In other embodiments, the rear surface portion 428 includes a width that is wider than a width of the forward surface portion 426, such that the fins 422 are wedge-shaped. In still other embodiments, the fins 422 lack faces. Instead, each of the forward and rear surface portions 426 and 428 are continuous between the two fins 422, such that the second end 412 is a downwardly pointed cone. Numerous variations of the fins 422 are foreseen.

The central bore 414 extends downwardly from the orifice 416 and longitudinally within the body 408 such that it is coaxial with the longitudinal axis D. The bore 414 includes a curvate inner surface 430 and a lower chamber 432. In the illustrated embodiment, the bore 414 includes a circular cross-section with a first diameter D22, wherein the cross-section is taken perpendicular to the longitudinal axis D. Similar to the bore 114, a plurality of bore cross-sections may be taken along the length of the bore 414, or along the longitudinal axis D, wherein each of the cross-sections includes a diameter D22, which, for example, may be denoted as $D22_1$, $D22_2, D22_3, \ldots$, and $D22_n$, wherein n is an integer associated with one of the plurality of bore cross-sections taken. It is noted that the diameters $D22_n$ of the plurality of bore cross-sections may be equal, such as if the bore 414 is cylindrical along its entire length. Alternatively, the diameters $D22_n$ may vary in size continuously or intermittently along at least a portion of the length of the bore 414, such as if the bore 414 includes two cylindrical portions of different diameters $D22_n$, or such as if the bore 414 is at least partially conical or otherwise shaped. However, with the exception of certain portions of the apparatus 400 discussed below, each of the bore cross-section diameters D22, is substantially greater than a diameter D23 of a perpendicular cross-section of an associated portion of the indicator structure 404 that must pass therethrough. In FIGS. 12 and 13, D22 is greater than D23. It is foreseen that the indicator structure diameter D23 may vary continuously or intermittently along a length of the indicator structure 404.

The orifice 416 is located at the housing first end 410 and joins the central bore 414 with the housing exterior portion 419. The orifice 416 is sized and shaped to slidingly receive at least a portion of the indicator structure 404 therethrough. In the illustrated embodiment, the orifice 416 is substantially circular, with a diameter D24, wherein D24 is greater than D23. Accordingly, the indicator structure 404, which includes the diameter D23, can slidingly move through the orifice 416, or pop up, such as from the closed configuration of FIG. 12 to the open configuration of FIG. 13.

Referring now to FIGS. 12 and 13, the bore 414 includes the lower chamber 432, which is located at the housing closed second end 412 and is substantially coaxial with the longitudinal axis D. In the illustrated embodiment, the chamber 432 is substantially cylindrical with a circular cross-section having a diameter D27, wherein the cross-section is taken perpendicular to the longitudinal axis D. In the illustrated embodiment, the chamber diameter D27 is reduced with respect to the diameter D22 of the portion of the bore 414 that extends upwardly from the chamber 432, said upwardly extending portion being denoted generally by the numeral 446. It is foreseen that the chamber diameter D27 may be equal to or greater than the diameter D22 of said upwardly extending portion 446 of the bore 414. Further, the diameter D27 may vary continuously or intermittently along at least a portion of the length of the chamber 432.

An inwardly extending, sloped shoulder portion 448 joins the bore upwardly extending portion 446 with the chamber 432. In the illustrated embodiment, the shoulder portion 448 is conical, with an upper diameter of about D22 and a lower diameter of about D27. It is foreseen that the shoulder portion 448 may also be an annular shelf, such as described above. At its lower end, the bottom surface 452 of the chamber 432 may be flat, concave, conical, a combination thereof, or otherwise contoured.

The indicator structure 404 cooperates with the housing 402 to indicate attainment of the particular temperature associated with the doneness of the food item. To do so, the indicator structure 404 moves from the closed configuration of FIG. 12 to the open configuration of FIG. 13. The indicator structure 404 includes a stem 454 joined with a button indicator 456. When the apparatus 400 is closed, the indicator structure 404 extends from the orifice 416 to substantially near the chamber bottom surface 452, and may contact or touch the bottom surface 452, such as is shown in the illustrated embodiment. However, it is foreseen that the indicator structure 404 may extend downwardly only a portion of the length of the chamber 432, such as but not limited to about one quarter, one half or three quarters the length of the chamber 432, so long as the indicator structure 404 fulfills its function as is described herein.

The stem 454 includes upper and lower portions 458 and 460, respectively, with a centrally located perpendicular through-bore or eye 462. The stem upper portion 458 is joined with a lower surface 464 of the button 456. In the illustrated embodiment, both the upper and lower portions 458 and 460 are cylindrical or partially conical, and coaxial with the longitudinal axis D. The length of the upper portion 458 is reduced with respect to the lower portion 460 and the lower portion 460 includes substantially reduced diameter D28 with respect to the diameter D26 of the stem upper portion 458. It is foreseen that the upper and lower portions 458 and 460 may have alternative dimensions, such as is described with respect to the device 100. The stem eye 462 is sized and shaped to receive the biasing member 450 therethrough, such as is described below. Further, the eye 462 is spaced a distance below the button 456 sufficient that when the biasing member 450 is not substantially stretched, such as is shown in FIG. 13, the button 456 is lifted a sufficient distance above the flange 418 to provided the aforementioned visible indication of doneness.

At its lower end, the stem 454 includes a foot portion 472, which engages a non-metallic high-melt plug 474 at the bottom of the chamber 432. The plug 474 is discussed in detail below. In the illustrated embodiment, the foot portion 472 is extensively contoured, so as to include one or more bumps, bulges, rings, fins, fingers, spheres and the like. For example, in the illustrated embodiment, the foot portion 472 includes conical, ring-like and hemispherical portions. It is foreseen that the foot portion 472 may have any other shape so long as long at it fulfills its function as described herein.

In the closed configuration shown in FIG. 12, the lower end 480 of the foot portion 472 contacts the lower chamber bottom surface 452. However, in the open configuration, shown in FIG. 13, the foot portion lower end 480 is substantially raised above the chamber bottom surface 452. In some circumstances, depending upon the volume of the lower chamber 432 and the amount of the plug material 474 used, the stem foot portion 472 may be raised above or out of the plug material 474, or at least a portion of the foot portion 472 may remain within the plug 474.

The button indicator 456, or button, is joined with an upper end, generally 482, of the stem 454. The button indicator 456 extends radially from the stem 454 and includes top and bottom surfaces 484 and 486, respectively, joined by a rim surface 488. In the illustrated embodiment, the button indicator 456 includes a circular cross-section, taken perpendicular to the longitudinal axis D, wherein the cross-section includes a diameter that is greater than the orifice diameter D24, such that the button 456 at least partially overlaps the flange 418. However, it is foreseen that the button may have any other shaped cross-section, such as but not limited to polygonal and ovular cross-sections, so long as long at it fulfills its function as described herein.

The button 456 bottom surface 486 is substantially annular, planar and perpendicular to the longitudinal axis D. The top surface 484 is convex or dome shaped, but may alternatively be planar or even concave. The rim surface 488 defines the circular perimeter thereof. The rim surface 488 may be planar and run parallel with the longitudinal axis D, or it may be rounded or convex, so as to present a curvate contour. At least a portion of the button 456 may be coated with a non-stick polymer or wax material, such as is known in the art, such as but not limited to polytetrafluoroethylene (PTFE).

The button 456 further includes a pair of spaced finger-receiving bores 489 that also join the top and bottom surfaces 484 and 464. The finger-receiving bores 489 are sized and shaped so as to slidingly receive an upwardly extending finger 491 therethrough, said fingers 489 being described in greater detail below. Accordingly, each of the finger-receiving bores 489 is vertically aligned one of the upwardly extending fingers 491. When the apparatus 400 is in the closed configuration of FIG. 12, each finger 491 extends upwardly through an associated finger-receiving bore 489 such that a top surface of the finger 491 is relatively aligned or flush with the button top surface 484. When the apparatus 400 moves toward the open configuration of FIG. 9, the finger-receiving bores 489 pass upwardly over or around the associated fingers 491 as the button 444 pops up.

The flange portion 418 extends radially from the housing 408 so as to be generally perpendicular to the longitudinal axis D. In addition to lower surface 420, the flange portion 418 includes an upper surface 490 and a pair of opposed fingers 491 that extend upwardly from the upper surface 490. The fingers 491 are associated with the orifice 416. Each finger 491 includes an upwardly extending stem portion 491A and optionally a hook portion 491B. The fingers 491 are sized and shaped to engage the ends of the biasing member 450, such as described herein. The fingers 481 are also sized and shaped so as to be slidingly received through an associated finger-receiving bore 489. The flange portion 418 also may be coated with the non-stick material, such as but not limited to polytetrafluoroethylene (PTFE). The flange portion 418 substantially prevents the apparatus 400 from being inserted in its entirety, or too far, into the food item. For example, the flange lower surface 420 may contact or engage the food surface when the body 408 is inserted or embedded in the food item.

When the apparatus 400 is in the closed configuration, the button lower surface 486 is substantially adjacent to the flange portion upper surface 490. In some embodiments, the button indicator lower surface 486 and the flange portion upper surface 490 contact one another, such that they are mated or engaged. Additionally, in the closed configuration, the fingers 491 are received in and optionally extend through the finger-receiving bores 489. In some embodiments, the flange portion upper surface 490 may be inwardly contoured or concave, so as to form a recess sized and shaped to receive at least a lower portion of the button 456 therein.

When the apparatus 400 is in the open configuration, the button lower surface 486 is spaced a distance above the flange portion upper surface 490, so as to provide the visual indication of attainment of doneness, wherein the distance is sufficiently great so as to be visually detectable by a user.

The actuation subassembly 406 controls the temperature dependent pop up action of the button indicator 456. The actuation subassembly 406 includes the biasing member 450 and the food safe, non-metallic high-melt plug 474 described above. The biasing member 450 is a structure that biases the stem 454 away from the lower chamber 432. In the embodiment of FIGS. 12 and 13, the biasing member 450 is an extensible elastic band 492 with first and second ends 494, respectively, that engage the fingers 491. For example, each end 494 may include a perforation to frictionally receive a finger stem 491A therethrough. In another example, the ends 494 are head bonded or glued to the associated fingers 491. The elastic band 492 is formed of a non-metallic polymer known in the art that is elastic, flexible and resilient. The elastic band 492 is resistant to melting at high cooking temperatures, such as but not limited to about 550° F. (287.8° C.) and is food-safe.

The a central portion 496 of the elastic band 492 is received through the stem eye 462. When the apparatus 400 is closed (e.g., FIG. 12), the stem 451 stretches the elastic band 492 downwardly into the bore 414, such as by applying a force to the band central portion 496, and such that the elastic band 492 includes or acquires an amount of potential or spring energy. When the apparatus 400 is open (e.g., FIG. 13), the stem 451 is released by the softened plug 474A, and the elastic band 492 returns or springs back to a more relaxed state or a not substantially stretched configuration, thereby releasing a substantial portion of the stored energy and making the button 456 pop up. When the apparatus 400 is in the open configuration, the elastic band 492 is in an at least partially relaxed state relative to when the device 400 is closed and depending upon the size, shape and fabrication material of the elastic band 492, such as is known in the art.

The non-metallic high-melt plug 474 is substantially identical to the plug 174 described above. Prior to reaching the particular temperature, the plug 474 is substantially solid, hardened or fused. The solid plug 474 surrounds and engages at least a portion of the stem foot portion 472 and holds down the stem foot portion 472, so that the elastic band 492 is stretched, such as is shown in FIG. 12.

When the particular temperature is reached or achieved, the plug 474 softens, or melts, an amount sufficient to release the stem foot portion 472. Softened plug material is denoted by the numeral 474A. Since the stem foot portion 472 is no longer held down by the melted plug 474A, the elastic band 492 releases its stored potential energy by moving to the more relaxed configuration and becoming not substantially stretched, such as is shown in FIG. 13. As the elastic band 492 moves toward the open configuration of FIG. 13, the foot portion 472 is raised out of the melted plug material 474A and the button indicator 456 is simultaneously lifted away from the flange portion 418, so as to indicate that the food item is done.

FIGS. 14 and 15 illustrate the non-metallic doneness indicator in a fifth embodiment denoted generally by the numeral 500, which is similar to the non-metallic doneness indicator 100 of the first embodiment, the description of which is incorporated herein by reference. FIGS. 14 and 15 show the doneness indicator 500 in the closed and open configurations, respectively, such as is described above with respect to the doneness indicator 100. The closed configuration, shown in FIG. 14, is associated with the food not having attained the specific temperature, and therefore the food is not done, while the open configuration, shown in FIG. 15, is associated with the food having attained the specific temperature, such that the food item is done, such as is described above with respect to the apparatus 100.

The apparatus 500 includes a longitudinal axis E, a longitudinally extending housing 502, a movable indicator structure 504 sized and shaped to cooperate with the housing 502 so as to pop up when the food is done and thereby provide a visually detectable indicator of food doneness, and an actuation subassembly, generally 506, that causes the indicator structure 504 to pop up when the food is done.

The apparatus housing 502 includes a barrel-like body 508 that extends along the longitudinal axis E from an open first end 510 to a closed second end 512. The body 508 includes a centrally located longitudinal bore 514 that is coaxial with the longitudinal axis E. The first end 510 includes an orifice 516 and a radially extending flange portion 518. The orifice 516 joins the bore 514 with the exterior portion 519 of the body 508.

When in use, the substantially cylindrical body 508 is inserted into the food item until a lower surface 520 of the flange 518 contacts the surface of the food. The flange 518 provides an enlarged structure that substantially prevents the entire device 500 from being completely inserted or embedded into the food. The closed second end 512 is sized and shaped for piercing the food object. In the illustrated embodiment, the second end 512 is substantially conical and pointed. However, it is foreseen that the second end 512 may be blunt, flat or semi-spherical, or may have numerous other shapes.

The body exterior portion 519 includes one or more outwardly extending fins 522, pins or barbs similar to the fins 122, 222, 322 and 422. In the illustrated embodiment, the fins 522 are spaced from both the housing first and second ends 510 and 512. However, it is foreseen that the fins 522 may be located relatively closer to either of the first and second ends 510 and 512. In still other embodiments, the apparatus 500 lacks fins entirely.

In the illustrated embodiment of FIGS. 14 and 15, each of the fins 522 includes a pair of opposed faces that are similar to the faces 124 and that are joined by a forward surface portion 526 and a rear surface portion 528. Each of the fins 522 includes a generally triangular cross-section, wherein the cross-section is taken parallel to the longitudinal axis E and evenly separates the faces. In some embodiments, the faces are spaced, planar and run parallel with one another and the longitudinal axis E, such that the fins 522 are substantially thin and flat. In other embodiments, the rear surface portion 528 includes a width that is wider than a width of the forward surface portion 526, such that the fins 522 are wedge-shaped. In still other embodiments, the fins 522 lack faces. Instead, each of the forward and rear surface portions 526 and 528 are continuous between the two fins 522, such that the second end 512 is a downwardly pointed cone. Numerous variations of the fins 522 are foreseen.

The central bore 514 extends downwardly from the orifice 516 and longitudinally within the body 508 such that it is coaxial with the longitudinal axis E. The bore 514 includes a curvate inner surface 530, ledge portion 531 adjacent to the orifice 516, and a lower chamber 532. In the illustrated embodiment, the bore 514 includes a circular cross-section with a first diameter D29, wherein the cross-section is taken perpendicular to the longitudinal axis E. Similar to the bore 114, a plurality of bore cross-sections may be taken along the length of the bore 514, or along the longitudinal axis E, wherein each of the cross-sections includes a diameter D29, which, for example, may be denoted as $D29_1, D29_2, D29_3, \ldots, D29_n$, wherein n is an integer associated with one of the plurality of bore cross-sections taken. It is noted that the diameters $D29_n$ of the plurality of bore cross-sections may be equal, such as if the bore 514 is cylindrical along its entire length. Alternatively, the diameters $D29_n$ may vary in size continuously or intermittently along at least a portion of the length of the bore 514, such as if the bore 514 includes two cylindrical portions of different diameters $D29_n$, or such as if the bore 514 is at least partially conical or otherwise shaped. However, each of the bore cross-section diameters $D29_n$ is substantially greater than a diameter D30 of a perpendicular cross-section of an associated portion of the indicator structure 504 that must pass therethrough. In FIGS. 14 and 15, D29 is greater than D30. It is foreseen that the indicator structure diameter D30 may vary continuously or intermittently along a length of the indicator structure 504.

The orifice 516 is located at the housing first end 510 and joins the central bore 514 with the housing exterior portion 519. The orifice 516 is sized and shaped to slidingly receive at least a portion of the indicator structure 504 therethrough. In the illustrated embodiment, the orifice 516 is substantially circular, with a diameter D31, wherein D31 is greater than D30. Accordingly, the indicator structure 504, which includes the diameter D30, can slidingly move through the orifice 516, or pop up, such as from the closed configuration of FIG. 14 to the open configuration of FIG. 15.

The bore includes the ledge portion 531, which engages the biasing member 550, described below. Referring to FIG. 15, the ledge portion 531 includes an annular shoulder 531A joined with a vertical portion 531B. The shoulder 531A is substantially planar and runs perpendicular to the longitudinal axis E. The shoulder 531A includes an inner edge 531C that joins the portion of the bore that extends downwardly therefrom. The vertical portion 531B joins the outer edge 531D of the shoulder 531A and extends upwardly therefrom and joins with the orifice 516. The outer edge 531D defines a substantially circular perimeter of the shoulder 531A.

Referring now to FIGS. 14 and 15, the bore 514 includes the lower chamber 532, which is located at the housing closed second end 512 and is substantially coaxial with the longitudinal axis E. In the illustrated embodiment, the chamber 532 is substantially cylindrical with a circular cross-section having a diameter D34, wherein the cross-section is taken perpendicular to the longitudinal axis E. In the illustrated embodiment, the chamber diameter D34 is reduced with respect to the diameter D29 of the portion of the bore 514 that extends upwardly from the chamber 532, said upwardly extending portion being denoted generally by the numeral 546. It is foreseen that the chamber diameter D34 may be equal to or greater than the diameter D29 of said upwardly extending portion 546 of the bore 514. Further, the diameter D34 may vary continuously or intermittently along at least a portion of the length of the chamber 532.

An inwardly extending, sloped shoulder portion 548 joins the bore upwardly extending portion 546 with the chamber 532. In the illustrated embodiment, the surface of the shoulder portion 548 is slightly inwardly bowed or convex from top to bottom. It is foreseen that the shoulder portion 548 may also be an annular shelf, such as described above. The chamber 532 defines a generally nipple-shaped space or receptacle, but the bottom surface 552 may also be flat, concave, conical, a combination thereof, or otherwise contoured.

The indicator structure 504 cooperates with the housing 502 to indicate attainment of the particular temperature associated with the doneness of the food item. To do so, the indicator structure 504 moves from the closed configuration of FIG. 14 to the open configuration of FIG. 15. The indicator structure 504 includes a stem 554 joined with a button indicator 556. When the apparatus 500 is closed, the indicator structure 504 extends from the orifice 516 to substantially near the chamber bottom surface 552, and may contact or touch the bottom surface 552, such as is shown in the illustrated embodiment. However, it is foreseen that the indicator structure 504 may extend downwardly only a portion of the length of the chamber 532, such as but not limited to about one quarter, one half or three quarters the length of the chamber 532, so long as the indicator structure 504 fulfills its function as is described herein.

The stem 554 includes upper and lower portions 558 and 560, respectively, joined by a wall portion 562. The wall portion 562 includes a substantially planar surface 562A that runs perpendicular to the longitudinal axis E. The planar surface 562A defines a ring-like or annular shape with an outer diameter substantially equal to the diameter D30 and an inner diameter substantially equal to diameter of the stem lower portion 560.

The stem upper portion 558 is joined with a lower surface 564 of the button 556. In the illustrated embodiment, both the upper and lower portions 558 and 560 are cylindrical or partially conical, and coaxial with the longitudinal axis E. The length of the upper portion 558 is reduced with respect to the lower portion 560 and the lower portion 560 includes substantially reduced diameter D35 with respect to the diameter D33 of the stem upper portion 558. It is foreseen that the upper and lower portions 558 and 560 may have alternative dimensions, such as is described with respect to the device 100. The stem wall portion 562 is sized and shaped to engage the biasing member 550, such as is described below. Further, the wall portion 562 is spaced a distance below the button 556 sufficient that when the biasing member 550 is not substantially stretched, such as is shown in FIG. 15, the button 556 is lifted a sufficient distance above the flange 518 to provided the aforementioned visible indication of doneness.

At its lower end, the stem 554 includes a foot portion 572, which engages a non-metallic high-melt plug 574 at the bottom of the chamber 532. The plug 574 is discussed in detail below. In the illustrated embodiment, the foot portion 572 is substantially arrowhead- or spearhead-shaped, such as described above with regards to foot portion 172. However, the foot portion 572 may also be extensively contoured, so as to include one or more bumps, bulges, rings, fins, fingers, spheres and the like, such as described with regards to the foot portion 472. It is foreseen that the foot portion 572 may have any other shape so long as long at it fulfills its function as described herein.

In the closed configuration shown in FIG. 14, the lower end 580 of the foot portion 572 contacts the lower chamber bottom surface 552. However, in the open configuration, shown in FIG. 15, the foot portion lower end 580 is substantially raised above the chamber bottom surface 552. In some circumstances, depending upon the volume of the lower chamber 532 and the amount of the plug material 574 used, the stem foot portion 572 may be raised above or out of the plug material 574, or at least a portion of the foot portion 572 may remain within the plug 574.

The button indicator 556, or button, is joined with an upper end, generally 582, of the stem 554. The button indicator 556 extends radially from the stem 554 and includes top and bottom surfaces 584 and 586, respectively, joined by a rim surface 588. In the illustrated embodiment, the button indicator 556 includes a circular cross-section, taken perpendicular to the longitudinal axis E, wherein the cross-section includes a diameter that is greater than the orifice diameter D31, such that the button 556 at least partially overlaps the flange 518. However, it is foreseen that the button may have any other shaped cross-section, such as but not limited to polygonal and ovular cross-sections, so long as long at it fulfills its function as described herein.

The button 556 bottom surface 586 is substantially annular, planar and perpendicular to the longitudinal axis E. The top surface 584 is convex or dome shaped, but may alternatively be planar or even concave. The rim surface 588 defines the circular perimeter thereof. The rim surface 588 may be planar and run parallel with the longitudinal axis E, or it may be rounded or convex, so as to present a curvate contour. At least a portion of the button 556 may be coated with a non-stick polymer or wax material, such as is known in the art, such as but not limited to polytetrafluoroethylene (PTFE).

The flange portion 518 extends radially from the housing 508 so as to be generally perpendicular to the longitudinal axis E. In addition to lower surface 520, the flange portion 518 includes a radially upper surface 590. The flange portion 518 also may be coated with the non-stick material, such as but not limited to polytetrafluoroethylene (PTFE). The flange portion 518 substantially prevents the apparatus 500 from being inserted in its entirety, or too far, into the food item. For example, the flange lower surface 520 may contact or engage the food surface when the body 508 is inserted or embedded in the food item.

When the apparatus 500 is in the closed configuration, the button lower surface 586 is substantially adjacent to the flange portion upper surface 590. In some embodiments, the button indicator lower surface 586 and the flange portion upper surface 590 contact one another, such that they are mated or engaged. In some embodiments, the flange portion upper surface 590 may be inwardly contoured or concave, so as to form a recess sized and shaped to receive at least a lower portion of the button 556 therein.

When the apparatus 500 is in the open configuration, the button lower surface 586 is spaced a distance above the flange portion upper surface 590, so as to provide the visual indication of attainment of doneness, wherein the distance is sufficiently great so as to be visually detectable by a user.

The actuation subassembly 506 controls the temperature dependent pop up action of the button indicator 556. The actuation subassembly 506 includes the biasing member 550 and the food safe, non-metallic high-melt plug 574 described above. The biasing member 550 is a structure that biases the stem 554 away from the lower chamber 532. In the embodiment of FIGS. 14 and 15, the biasing member 550 is an extensible elastic diaphragm 592 with upper and lower surfaces 592A and 592B, respectively, joined by an outer surface 592C. The lower and outer surfaces 592B and 592C are attached to the ledge portion 531, such as but not limited by heat-bonding, micro-welding or an adhesive. For example, a portion of the lower surface 592B is attached to the annular shoulder 531A and the lower surface 592C is attached to the vertical portion 531B. The elastic diaphragm 592 is formed of a non-metallic polymer known in the art that is elastic, flexible and resilient. The elastic diaphragm 592 is resistant to melting at high cooking temperatures, such as but not limited to about 550° F. (287.8° C.) and is food-safe.

The elastic diaphragm 592 includes a centrally located stem-receiving bore or perforation 596, through which the stem lower portion 560 is inserted or received. The perforation 596 is coaxial with the longitudinal axis E and includes an inner surface 596A that defines a diameter D32 that is substantially equal to or slightly smaller than the diameter D35 of the stem lower portion 560. Accordingly, when the stem lower portion 560 is fully received through the perforation 596, the stem wall portion 562 overlaps and frictionally engages the diaphragm upper surface 592A and perforation inner surface 596A tightly frictionally engages an adjacent surface of the stem lower portion 560. It is foreseen that these surface engagements may include an adhesive, heat-bonding or micro-welding.

When the apparatus 500 is closed (e.g., FIG. 14), the stem 554 stretches the elastic diaphragm 592 downwardly into the bore 514, such that the diaphragm 592 includes or acquires an amount of potential or spring energy. When the apparatus 500 is open (e.g., FIG. 15), the stem 554 is released by the softened plug 574A, and the diaphragm 592 returns or springs back to a more relaxed state or a not substantially stretched configuration, thereby releasing a substantial portion of the stored energy and making the button 556 pop up. When the apparatus 500 is in the open configuration, the diaphragm 592 is in an at least partially relaxed state relative to when the device 500 is closed and depending upon the size, shape and fabrication material of the diaphragm 592, such as is known in the art.

The non-metallic high-melt plug 574 is substantially identical to the plug 174 described above. Prior to reaching the particular temperature, the plug 574 is substantially solid, hardened or fused. The solid plug 574 surrounds and engages at least a portion of the stem foot portion 572 and holds down the stem foot portion 572, so that the elastic diaphragm 592 is stretched, such as is shown in FIG. 14.

When the particular temperature is reached or achieved, the plug 574 softens, or melts, an amount sufficient to release the stem foot portion 572. Softened plug material is denoted by the numeral 574A. Since the stem foot portion 572 is no longer held down by the melted plug 574A, the diaphragm 592 releases its stored potential energy by moving to the more relaxed configuration and becoming not substantially stretched, such as is shown in FIG. 15. As the diaphragm 592 moves toward the open configuration of FIG. 15, the foot portion 572 is raised out of the melted plug material 574A and the button indicator 556 is simultaneously lifted away from the flange portion 518, so as to indicate that the food item is done.

FIGS. 16 and 17 illustrate the non-metallic doneness indicator in a sixth embodiment denoted generally by the numeral 600, which is similar to the non-metallic doneness indicators 100 and 500, the descriptions of which are incorporated herein by reference. FIGS. 16 and 17 show the doneness indicator 600 in the closed and open configurations, respectively, such as is described above with respect to the doneness indicators 100 and 500. The closed configuration, shown in FIG. 16, is associated with the food not having attained the specific temperature, and therefore the food is not done, while the open configuration, shown in FIG. 17, is associated with the food having attained the specific temperature, such that the food item is done, such as is described above with respect to the apparatus 100 and 500.

The apparatus 600 includes a longitudinal axis F, a longitudinally extending housing 602, a movable indicator structure 604 sized and shaped to cooperate with the housing 602 so as to pop up when the food is done and thereby provide a visually detectable indicator of food doneness, and an actuation subassembly, generally 606, that causes the indicator structure 604 to pop up when the food is done.

The apparatus housing 602 includes a barrel-like body 608 that extends along the longitudinal axis F from an open first end 610 to a closed second end 612. The body 608 includes a centrally located longitudinal bore 614 that is coaxial with the longitudinal axis F. The first end 610 includes an orifice 616 and a short conical flange portion 618. The orifice 616 joins the bore 614 with the exterior portion 619 of the body 608.

When in use, the substantially cylindrical body 608 is inserted into the food item until at least a lower surface 620 of the flange 618 and a portion of the indicator structure 604 contact the surface of the food. Together, the flange 618 and indicator structure 604 provide an enlarged structure that substantially prevents the entire device 600 from being completely inserted or embedded into the food. The closed second end 612 is sized and shaped for piercing the food object. In the illustrated embodiment, the second end 612 is substantially conical and pointed. However, it is foreseen that the second end 612 may be blunt, flat or semi-spherical, or may have numerous other shapes.

The body exterior portion 619 includes one or more outwardly extending fins 622, pins or barbs similar to the fins described above. In the illustrated embodiment, the fins 622 are spaced from both the housing first and second ends 610 and 612. However, it is foreseen that the fins 622 may be located relatively closer to either of the first and second ends 610 and 612. In still other embodiments, the apparatus 600 lacks fins entirely.

In the illustrated embodiment of FIGS. 16 and 17, each of the fins 622 includes a pair of opposed faces that are similar to the faces 124 and that are joined by a forward surface portion 626 and a rear surface portion 628. Each of the fins 622 includes a generally triangular cross-section, wherein the cross-section is taken parallel to the longitudinal axis F and evenly separates the faces. In some embodiments, the faces are spaced, planar and run parallel with one another and the longitudinal axis F, such that the fins 622 are substantially thin and flat. In other embodiments, the rear surface portion 628 includes a width that is wider than a width of the forward surface portion 626, such that the fins 622 are wedge-shaped.

In still other embodiments, the fins 622 lack faces. Instead, each of the forward and rear surface portions 626 and 628 are continuous between the two fins 622, such that the second end 612 is a downwardly pointed cone. Numerous variations of the fins 622 are foreseen.

The central bore 614 extends downwardly from the orifice 616 and longitudinally within the body 608 such that it is coaxial with the longitudinal axis F. The bore 614 includes a curvate inner surface 630 and a lower chamber 632. In the illustrated embodiment, the bore 614 includes a circular cross-section with a first diameter D29, wherein the cross-section is taken perpendicular to the longitudinal axis F. Similar to the bore 114, a plurality of bore cross-sections may be taken along the length of the bore 614, or along the longitudinal axis F, wherein each of the cross-sections includes a diameter D$36_1$, which, for example, may be denoted as D$36_1$, D$36_2$, D$36_3$, . . . , and D$36_n$, wherein n is an integer associated with one of the plurality of bore cross-sections taken. It is noted that the diameters D$36_n$ of the plurality of bore cross-sections may be equal, such as if the bore 614 is cylindrical along its entire length. Alternatively, the diameters D$36_n$ may vary in size continuously or intermittently along at least a portion of the length of the bore 614, such as if the bore 614 includes two cylindrical portions of different diameters D$36_n$, or such as if the bore 614 is at least partially conical or otherwise shaped. However, each of the bore cross-section diameters D$36_n$ is substantially greater than a diameter D37 of a perpendicular cross-section of an associated portion of the indicator structure 604 that must pass therethrough. In FIGS. 16 and 17, D36 is greater than D37. It is foreseen that the indicator structure diameter D37 may vary continuously or intermittently along a length of the indicator structure 604.

The orifice 616 is located at the housing first end 610 and joins the central bore 614 with the housing exterior portion 619. The orifice 616 is sized and shaped to slidingly receive at least a portion of the indicator structure 604 therethrough. In the illustrated embodiment, the orifice 616 is substantially circular, with a diameter D38, wherein D38 is greater than D37. Accordingly, the indicator structure 604, which includes the diameter D37, can slidingly move through the orifice 616, or pop up, such as from the closed configuration of FIG. 16 to the open configuration of FIG. 17.

Referring now to FIGS. 16 and 17, the bore 614 includes the lower chamber 632, which is located at the housing closed second end 612 and is substantially coaxial with the longitudinal axis F. In the illustrated embodiment, the chamber 632 is generally nipple-shaped with a circular cross-section having a variable diameter D$41_n$, wherein the cross-section is taken perpendicular to the longitudinal axis F and n is an integer associated with one of a plurality of chamber cross-sections taken. In the illustrated embodiment, the chamber includes a smooth continuous surface 632A with a substantially inwardly bowed or convex upper portion 632B and a bowl-shaped or concave bottom portion 632C. The chamber diameter D41 is reduced with respect to the diameter D36 of the portion of the bore 614 that extends upwardly from the chamber 632, said upwardly extending portion being denoted generally by the numeral 646. It is foreseen that the chamber diameter D41 may be equal to or greater than the diameter D36 of said upwardly extending portion 646 of the bore 614, and may be substantially cylindrical or conical. Further, the diameter D41 may vary continuously or intermittently along at least a portion of the length of the chamber 632.

An inwardly extending, sloped shoulder portion 648 joins the bore upwardly extending portion 646 with the chamber 632. In the illustrated embodiment, the surface of the shoulder portion 648 is slightly inwardly bowed or convex from top to bottom. It is foreseen that the shoulder portion 648 may also be an annular shelf, such as described above. The chamber 632 defines a generally nipple-shaped space or receptacle, but the bottom surface 652 may also be flat, concave, conical, a combination thereof, or otherwise contoured.

The indicator structure 604 cooperates with the housing 602 to indicate attainment of the particular temperature associated with the doneness of the food item. To do so, the indicator structure 604 moves from the closed configuration of FIG. 16 to the open configuration of FIG. 17. The indicator structure 604 includes a stem 654 joined with a button indicator 656. When the apparatus 600 is closed, the indicator structure 604 extends from the orifice 616 to substantially near the chamber bottom surface 652, and may contact or touch the bottom surface 652, such as is shown in the illustrated embodiment. However, it is foreseen that the indicator structure 604 may extend downwardly only a portion of the length of the chamber 632, such as but not limited to about one quarter, one half or three quarters the length of the chamber 632, so long as the indicator structure 604 fulfills its function as is described herein.

The stem 654 includes upper and lower portions 658 and 660, respectively, joined by a wall portion 662. The wall portion 662 includes a substantially planar surface 662A that runs perpendicular to the longitudinal axis F. The planar surface 662A defines a ring-like or annular shape with an outer diameter substantially equal to the diameter D37 and an inner diameter substantially equal to diameter of the stem lower portion 660.

The stem upper portion 658 is joined with a lower surface 664 of the button 656. In the illustrated embodiment, both the upper and lower portions 658 and 660 are cylindrical or partially conical, and coaxial with the longitudinal axis F. The length of the upper portion 658 is reduced with respect to the lower portion 660 and the lower portion 660 includes substantially reduced diameter D42 with respect to the diameter D40 of the stem upper portion 658. It is foreseen that the upper and lower portions 658 and 660 may have alternative dimensions, such as is described with respect to the device 100. The stem wall portion 662 is sized and shaped to engage the biasing member 650, such as is described below. Further, the wall portion 662 is spaced a distance below the button 656 sufficient that when the biasing member 650 is not substantially stretched, such as is shown in FIG. 17, the button 656 is lifted a sufficient distance above the flange 618 to provided the aforementioned visible indication of doneness.

At its lower end, the stem 654 includes a foot portion 672, which engages a non-metallic high-melt plug 674 at the bottom of the chamber 632. The plug 674 is discussed in detail below. In the illustrated embodiment, the foot portion 672 is substantially arrowhead- or spearhead-shaped, such as described above with regards to foot portion 172. However, the foot portion 672 may also be extensively contoured, so as to include one or more bumps, bulges, rings, fins, fingers, spheres and the like, such as described with regards to the foot portion 472. It is foreseen that the foot portion 672 may have any other shape so long as long at it fulfills its function as described herein.

In the closed configuration shown in FIG. 16, the lower end 680 of the foot portion 672 contacts the lower chamber bottom surface 652. However, in the open configuration, shown in FIG. 17, the foot portion lower end 680 is substantially raised above the chamber bottom surface 652. In some circumstances, depending upon the volume of the lower chamber 632 and the amount of the plug material 674 used, the stem foot portion 672 may be raised above or out of the plug material 674, or at least a portion of the foot portion 672 may remain within the plug 674.

The button indicator 656, or button, is joined with an upper end, generally 682, of the stem 654. The button indicator 656 extends radially from the stem 654 and includes top and bottom surfaces 684 and 686, respectively, joined by a rim surface 688. In the illustrated embodiment, the button indicator 656 includes a circular cross-section, taken perpendicular to the longitudinal axis F, wherein the cross-section includes a diameter that is greater than the orifice diameter D38, such that the button 656 at least partially overlaps the flange 618. However, it is foreseen that the button may have any other shaped cross-section, such as but not limited to polygonal and ovular cross-sections, so long as long at it fulfills its function as described herein.

The button 656 bottom surface 686 is substantially annular, planar and perpendicular to the longitudinal axis F. The top surface 684 is convex or dome shaped, but may alternatively be planar or even concave. The rim surface 688 defines the circular perimeter thereof. The rim surface 688 may be planar and run parallel with the longitudinal axis F, or it may be rounded or convex, so as to present a curvate contour. At least a portion of the button 656 may be coated with a non-stick polymer or wax material, such as is known in the art, such as but not limited to polytetrafluoroethylene (PTFE).

The flange portion 618 extends upwardly and outward from the housing 608 so as to be angled relative to the longitudinal axis F. In addition to lower surface 620, the flange portion 618 includes an upper surface 690. The flange 618 forms an outwardly flared ring for attachment of the biasing member 650, such as is described in greater detail below.

When the apparatus 600 is in the closed configuration, the button lower surface 686 is substantially adjacent to the flange portion upper surface 690. When the apparatus 600 is in the open configuration, the button lower surface 686 is spaced a distance above the flange portion upper surface 690, so as to provide the visual indication of attainment of doneness, wherein the distance is sufficiently great so as to be visually detectable by a user.

The actuation subassembly 606 controls the temperature dependent pop up action of the button indicator 656. The actuation subassembly 606 includes the biasing member 650 and the food safe, non-metallic high-melt plug 674 described above. The biasing member 650 is a structure that biases the stem 654 away from the lower chamber 632. In the embodiment of FIGS. 16 and 17, the biasing member 650 is an extensible elastic diaphragm 692 with upper and lower surfaces 692A and 692B, respectively, joined by an outer surface 692C, and with a diameter at least slightly greater than the upper end 610 of the apparatus 600, such that the diaphragm 692 can be attached to the flange 618. The diaphragm 692 includes a circular channel 692D spaced inwardly from the outer surface 692C. The circular channel 692D is sized and shaped so as to receive therein the flange 618. The circular channel 692D and the flange 618 may simply be held together by frictional engagement therebetween, or they may be attached by heat-bonding, micro-welding, an adhesive and the like. For example, the diaphragm 692 may be stretched so that the channel 692D can engage the flange 618. The diaphragm 692 is formed of a non-metallic polymer known in the art that is elastic, flexible and resilient. The diaphragm 692 is resistant to melting at high cooking temperatures, such as but not limited to about 550° F. (287.8° C.) and is food-safe.

The diaphragm 692 includes a centrally located stem-receiving bore or perforation 696, through which the stem lower portion 660 is inserted or received. The perforation 696 is coaxial with the longitudinal axis F and includes an inner surface 696A that defines a diameter D39 that is substantially equal to or slightly smaller than the diameter D42 of the stem lower portion 660. Accordingly, when the stem lower portion 660 is fully received through the perforation 696, the stem wall portion 662 overlaps and frictionally engages the diaphragm upper surface 692A and perforation inner surface 696A tightly frictionally engages an adjacent surface of the stem lower portion 660. It is foreseen that these surface engagements may include an adhesive, heat-bonding or micro-welding.

When the apparatus 600 is closed (e.g., FIG. 16), the stem 654 stretches the elastic diaphragm 692 downwardly into the bore 614, such that the diaphragm 692 includes or acquires an amount of potential or spring energy. When the apparatus 600 is open (e.g., FIG. 17), the stem 654 is released by the softened plug 674A, and the diaphragm 692 returns or springs back to a more relaxed state or a not substantially stretched configuration, thereby releasing a substantial portion of the stored energy and making the button 656 pop up. When the apparatus 600 is in the open configuration, the diaphragm 692 is in an at least partially relaxed state relative to when the device 600 is closed and depending upon the size, shape and fabrication material of the diaphragm 692, such as is known in the art.

The non-metallic high-melt plug 674 is substantially identical to the plug 174 described above. Prior to reaching the particular temperature, the plug 674 is substantially solid, hardened or fused. The solid plug 674 surrounds and engages at least a portion of the stem foot portion 672 and holds down the stem foot portion 672, so that the elastic diaphragm 692 is stretched, such as is shown in FIG. 16.

When the particular temperature is reached or achieved, the plug 674 softens, or melts, an amount sufficient to release the stem foot portion 672. Softened plug material is denoted by the numeral 674A. Since the stem foot portion 672 is no longer held down by the melted plug 674A, the diaphragm 692 releases its stored potential energy by moving to the more relaxed configuration and becoming not substantially stretched, such as is shown in FIG. 17. As the diaphragm 692 moves toward the open configuration of FIG. 17, the foot portion 672 is raised out of the melted plug material 674A and the button indicator 656 is simultaneously lifted away from the flange portion 618, so as to indicate that the food item is done.

FIGS. 1 through 4 illustrate assembly of the apparatus 100, in one embodiment. In a first step, the assembly components are assembled or put together. An amount of non-metallic plug material 174 is inserted into the housing body 108 through the orifice 116 and through the bore 114, until the plug material 174 is located at the bottom of the chamber 132. The biasing member 150, or spring 192, is then inserted into the bore 114 such that the spring lower end 196 engages the bore shoulder portion 148. Then the indicator structure 104 is inserted into the bore 114.

In a second step, shown in FIG. 2, the assembled assembly 100 is placed in a hot water bath or a heating block. A weight is placed on the top of the assembly, so that the indicator structure 104 is pushed down into the closed configuration. Alternatively, a clip may be used to hold the apparatus 100 closed. The assembly 100 is then heated for a period of time, at a temperature sufficient to melt or soften the plug material 174.

In a third step, when the plug material 174 has been sufficiently melted or softened, such that it uniformly surrounds or engages the foot portion 172, the apparatus 100 is removed to a cooling device, such as but not limited to an ice bucket or a cooling block. Then the plug material 174 hardens to a solid adapted to hold down the foot portion 172, such that the apparatus 100 remains in the closed configuration.

It is to be understood that while certain forms of the present invention have been illustrated and described herein, it is not to be limited to the specific forms or arrangement of parts described and shown.

What is claimed and desired to be secured by Letters Patent is as follows:

1. An apparatus for indicating doneness of a food object, comprising:
   a) a longitudinally extending housing adapted for insertion into a food object in which attainment of a particular temperature is to be indicated, the housing including
      I) an open first end;
      ii) a closed second end sized and shaped for insertion into the food object; and
      iii) a longitudinally extending central bore with an orifice and a lower chamber, the orifice joining the central bore with an exterior of the housing first end and the chamber being associated with the housing second end;
   b) a movable indicator structure cooperating with the housing to indicate attainment of the particular temperature associated with the doneness of the food item, and the indicator structure including
      I) an elongate stem extending longitudinally within the central bore, the stem having upper and lower portions; and
      ii) button indicator joined with an upper end of the stem;
   c) an actuation subassembly adapted for biasing the indicator structure from a closed configuration to an open configuration when the particular temperature is attained, the actuation subassembly including
      I) a non-metallic biasing member for biasing the stem away from the lower chamber; and
      ii) a non-metallic high-melt plug adapted to soften when the particular temperature is attained, the high-melt plug being located in the lower chamber and releasably engaging a lower end of the stem when the indicator structure is in the closed configuration;
   d) the housing first end includes a pair of opposed upwardly extending fingers;
   e) the stem includes a perpendicular through-bore spaced below the button indicator; and
   f) the biasing member includes an extensible elastic band extending through the through-bore and engaging each of the fingers.

2. The apparatus according to claim 1, wherein
   a) when the indicator structure is in the closed configuration, the elastic band is stretched and the button indicator is adjacent to the housing first end; and
   b) when the indicator structure is in the open configuration, the elastic band is not substantially stretched and the button indicator is spaced from the housing first end.

3. An apparatus for indicating doneness of a food object, comprising:
   a) a longitudinally extending housing adapted for insertion into a food object in which attainment of a particular temperature is to be indicated, the housing including
      I) an open first end;
      ii) a closed second end sized and shaped for insertion into the food object; and
      iii) a longitudinally extending central bore with an orifice and a lower chamber, the orifice joining the central bore with an exterior of the housing first end and the chamber being associated with the housing second end;
   b) a movable indicator structure cooperating with the housing to indicate attainment of the particular temperature associated with the doneness of the food item, and the indicator structure including
      I) an elongate stem extending longitudinally within the central bore, the stem having upper and lower portions; and
      ii) button indicator joined with an upper end of the stem;
   c) an actuation subassembly adapted for biasing the indicator structure from a closed configuration to an open configuration when the particular temperature is attained, the actuation subassembly including
      I) a non-metallic biasing member for biasing the stem away from the lower chamber; and
      ii) a non-metallic high-melt plug adapted to soften when the particular temperature is attained, the high-melt plug being located in the lower chamber and releasably engaging a lower end of the stem when the indicator structure is in the closed configuration;
   d) the bore orifice includes a radially extending ledge portion;
   e) the non-metallic biasing member includes an elastic diaphragm with
      I) an inner surface engaging the ledge portion;
      ii) an outer surface opposed to the inner surface; and
      iii) a central perforation joining the inner and outer surfaces and having a first diameter, the first diameter being less than a diameter of the stem upper portion and greater than a diameter of the stem lower portion; and wherein
   f) the stem lower portion extends through the diaphragm perforation; and
   g) a stem central shoulder portion engages the diaphragm outer surface.

4. The apparatus according to claim 3, wherein
   a) when the indicator structure is in the closed configuration, the diaphragm is stretched into the bore and the button indicator is adjacent to the housing first end; and
   b) when the indicator structure is in the open configuration, the diaphragm is not substantially stretched and the button indicator is spaced from the housing first end.

5. The apparatus according to claim 3, wherein the diaphragm includes
   a) an outer diameter that is greater than an outer diameter of the housing first end; and
   b) an attachment portion adapted for frictional engagement with the housing first end.

6. The apparatus according to claim 3, wherein
   a) the elastic diaphragm is substantially circular in a plane perpendicular to a longitudinal axis of the housing.

* * * * *